US012795751B2

(12) United States Patent
Belling et al.

(10) Patent No.: US 12,795,751 B2
(45) Date of Patent: Nov. 10, 2026

(54) BROADCAST SESSION ESTABLISHMENT

(71) Applicant: NOKIA TECHNOLOGIES OY, Espoo (FI)

(72) Inventors: Horst Thomas Belling, Erding (DE); David Navrátil, Helsinki (FI); Philippe Godin, Versailles (FR); Bruno Landais, Pleumeur-Bodou (FR)

(73) Assignee: NOKIA TECHNOLOGIES OY, Espoo (FI)

( * ) Notice: Subject to any disclaimer, the term of this patent is extended or adjusted under 35 U.S.C. 154(b) by 750 days.

(21) Appl. No.: 17/963,605

(22) Filed: Oct. 11, 2022

(65) Prior Publication Data

US 2023/0109786 A1 Apr. 13, 2023

(30) Foreign Application Priority Data

Oct. 11, 2021 (WO) .................. PCT/FI2021/050675

(51) Int. Cl.

*H04W 76/10* (2018.01)
*H04L 12/18* (2006.01)
*H04W 4/06* (2009.01)

(52) U.S. Cl.

CPC ............. *H04W 76/10* (2018.02); *H04W 4/06* (2013.01); *H04L 12/189* (2013.01)

(58) Field of Classification Search

CPC .... H04L 12/1868; H04L 12/189; H04W 4/06; H04W 76/10; H04W 76/40

See application file for complete search history.

(56) References Cited

U.S. PATENT DOCUMENTS

2004/0213177 A1* 10/2004 Moritani ............... H04L 12/189 370/328
2009/0190518 A1* 7/2009 Kim ...................... H04L 12/189 370/312

(Continued)

FOREIGN PATENT DOCUMENTS

CN 112954617 A 6/2021
KR 10-2021-0055546 A 5/2021

(Continued)

OTHER PUBLICATIONS

Sivanand, “System and Method for Tracking Active Clients in Wireless Multicast Network,” English Machine Translation of Sivanand (WO 2012/093927 A1), Clarivate Analytics, pp. 1-7 (Year: 2026).*

(Continued)

*Primary Examiner* — Thomas R Cairns
*Assistant Examiner* — Kai Chang
(74) *Attorney, Agent, or Firm* — SQUIRE PATTON BOGGS (US) LLP

(57) ABSTRACT

There are provided measures for enabling/realizing broadcast session establishment, particularly improved broadcast session establishment within a multicast/broadcast service. Such measures exemplarily comprise that an access management element or function in a mobile communication system issues, in response to a request of broadcast session establishment from a session management element or function, one or more requests of broadcast session establishment operation to one or more radio access elements or functions, issuing a response of broadcast session establishment to the session management element or function, and provides an indication of completion of broadcast session establishment operation at the radio access elements or functions to the session management element or function upon obtaining a response of broadcast session establish- (Continued)

ment operation from all of the radio access elements or functions.

16 Claims, 8 Drawing Sheets

(56) References Cited

U.S. PATENT DOCUMENTS

| | | | | |
|---|---|---|---|---|
| 2018/0255435 | A1* | 9/2018 | Li | H04L 9/40 |
| 2019/0223250 | A1* | 7/2019 | Dao | H04W 72/23 |
| 2020/0337093 | A1* | 10/2020 | Kim | H04W 64/00 |
| 2022/0053455 | A1* | 2/2022 | Baek | H04W 4/08 |
| 2022/0264258 | A1* | 8/2022 | Zong | H04W 76/11 |
| 2024/0172328 | A1* | 5/2024 | Ling | H04W 76/40 |

FOREIGN PATENT DOCUMENTS

| | | | | | |
|---|---|---|---|---|---|
| WO | WO-2012093927 | A1 * | 7/2012 | H04L 12/185 |
| WO | 2021/098108 | A1 | 5/2021 | |

OTHER PUBLICATIONS

3GPP TS 23.247 V17.0.0 (Sep. 2021), Technical Specification, 3rd Generation Partnership Project; Technical Specification Group Services and System Aspects; Architectural enhancements for 5G multicast-broadcast services; Stage 2 (Release 17), Sep. 2021.
Extended European Search Report dated Jun. 4, 2025 corresponding to European Patent Application No. 21960507.8.
International Search Report and Written Opinion dated Jun. 17, 2022 corresponding to International Patent Application No. PCT/FI2021/050675.
Cbn et al., "MBS Broadcast clarification," 3GPP Draft; S2-2106940, 3GPP TSG-WG SA2 Meeting #146E e-meeting, Elbonia, Aug. 16-27, 2021, Aug. 30, 2021, XP052059455.
Ericsson, "Update [7.3] with the new AMF service for broadcast MBS Session," 3GPP Draft, S2-2105642, SA WG2 Meeting #146E, Aug. 16-27, 2021, E-Meeting, Aug. 10, 2021, XP052055855.
Ericsson, "[TP for BL CR 38.300] Orderly specification work for NR MBS Session Management," 3GPP Draft; R3-213590, 3GPP TSG-RAN WG3 Meeting #113-e, Online, Aug. 16-27, 2021, Aug. 5, 2021, XP052032786.

* cited by examiner

BROADCAST SESSION ESTABLISHMENT

CROSS REFERENCE TO RELATED APPLICATION

This application claims the benefit of International Patent Application No. PCT/FI2021/050675, filed Oct. 11, 2021. The entire content of the above-referenced application is hereby incorporated by reference.

FIELD

The present disclosure relates to broadcast session establishment. More specifically, the present disclosure relates to measures/mechanisms (including methods, apparatuses (i.e. devices, entities, elements and/or functions) and computer program products) for enabling/realizing broadcast session establishment, particularly improved broadcast session establishment within a multicast/broadcast service.

BACKGROUND

Basically, the present disclosure relates to broadcast session establishment in a (mobile/wireless) communication system, such as 5G/NR systems and next generation systems beyond 5G (i.e. 6G, 7G, . . . ).

As an example, with regard to current 3GPP standardization, reference is made to 3GPP TS 23.247, V17.0.0 (2021 September ), dealing with architectural enhancements for 5G multicast-broadcast services, specifically section 7.3.1 (in connection with section 7.1.1.2 or 7.1.1.3). Therein, MBS session establishment for a broadcast service, i.e. broadcast session start or establishment, is defined with respect to a sequence diagram which is shown in FIG. 1.

As is evident from FIG. 1, the MBS Session Create (with MBS service type set to broadcast service) is used by the AF to indicate the impending start of the transmission of MBS data, and to provide the session attributes, so that resources for the MBS session are set up in the MB-UPF and in the NG-RAN for 5GC shared MBS traffic delivery.

In the present disclosure, focus is directed to the procedure between the MB-SMF, the AMF and the NG-RAN (wherein NG-RAN stands for one or more NG-RAN nodes, such as gNBs) within the thus illustrated example overview of broadcast session establishment. In step 2, the MB-SMF discovers the AMF(s) based on the MBS service area and selects the appropriate AMF(s) for broadcast session establishment. Then, the MB-SMF sends the MBS Session Resource Setup Request messages to the selected AMF(s) in parallel. In step 3, the AMF transfers the Namf_MBSBroadcast_ContextCreate Request message to all NG-RANs which support MBS in the MBS service area, wherein the AMF may include the MBS service area. In step 4, the NG-RAN creates a Broadcast MBS Session Context, and stores the TMGI and the QoS Profile in the MBS Session Context. If the NG-RAN prefers to use N3mb multicast transport (and if LL MC Address is available in the NG-RAN), the NG-RAN joins the multicast group (i.e. LL MC Address). If the NG-RAN prefers to use N3mb point-to-point or unicast transport (or if the LL MC Address is not available in the NG-RAN) between the NG-RAN and the MB-UPF, the NG-RAN provides its N3mb DL Tunnel Info. In step 6, the NG-RAN reports successful establishment of the MBS Session resources (which may include multiple MBS QoS flows) by sending MBS Session Resource Setup Response message(s) to the AMF, wherein the N3mb DL Tunnel Info is only available when point-to-point or unicast transport applies between the MB-UPF and the NG-RAN. In step 7, the AMF transfers the Namf_MBSBroadcast_ContextCreate Response to the MB-SMF. The AMF should respond success when it receives the first success response from the NG-RAN(s). If all NG-RAN(s) report failure, the AMF should respond failure. The MB-SMF stores the AMF(s) which respond success in the MBS Session Context as the downstream nodes for MBS data/session delivery.

Upon broadcast session establishment, the MB-SMF can provide an MBS Session Delivery Status Indication for Broadcast, as is defined in section 7.3.5 of 3GPP TS 23.247, V17.0.0 (2021 September). The MBS Session Delivery Status Indication for broadcast is used by the MB-SMF to notify the AF/AS of conditions affecting the delivery of the MBS session (e.g. MBS session activated, MBS session terminated, etc.). The occurrence of the indicated condition may be detected at/by the MB-SMF or may be reported to the MB-SMF by other entities involved in the MBS data/session delivery. Depending on whether an event for delivery status is subscribed by the NEF, the MBSF or the AF, the delivery status of the broadcast session is reported from the MB-SMF to the NEF, the MBSF or the AF, respectively.

According to current 3GPP standardization, the MB-SMF thus needs to be able to determine whether the broadcast session has been established successfully at/by all NG-RAN(s) and/or all cells within the MBS service area in order to be able to appropriately report the delivery status of the broadcast session to the NEF, the MBSF or the AF, respectively. That is, the MB-SMF needs to have knowledge on the NG-RAN(s) and/or cells, in/for which the broadcast session has been established, so as to be able to monitor these NG-RAN(s) and/or cells for conditions affecting the delivery of the MBS session, which are then to be reported (as events) in the MBS Session Delivery Status Indication for Broadcast.

The current MBS session establishment procedure, as explained above, however lacks corresponding details in the procedure between the MB-SMF, the AMF and the NG-RAN, such as the response from the AMF to the MB-SMF. Moreover, the MB-SMF may not have the knowledge on the involved NG-RAN(s) but only MBS service area as a list of at least one of tracking areas and/or cells.

Within the MBS session start or establishment for a broadcast service, the MB-SMF sends Namf_MBSBroadcast_ContextCreate Request to all AMFs affected by the service area of the MBS broadcast service (cf. step 2 in FIG. 1). Each such AMF contacts all NG-RAN nodes it controls that are within the service area of the broadcast session (cf. step 3 in FIG. 1). For each of the NG-RAN nodes, resource reservation for the broadcast session may succeed in some cells but fail in other cells within the service area (cf. step 4 in FIG. 1). The NG-RAN nodes can report success or failure (cf. step 6 in FIG. 1) and will also provide a transport address (i.e. N3mb DL Tunnel info) where they want to receive the data of the broadcast session via point-to-point or unicast transport. The AMF needs to provide appropriate information about the success and failure to the MB-SMF (cf. step 7 in FIG. 1).

One possibility is that the AMF accumulates all responses (cf. step 6) in FIG. 1) from the NG-RAN nodes before sending the message (Namf_MBSBroadcast_ContextCreate Response) to the MB-SMF. However, this would delay the delivery of broadcast data towards all NG-RAN nodes if point-to-point or unicast transport is used and also complicate the AMF implementation (contradicting the current specifications). Another possibility is that the AMF sends partial responses as soon as it receives the responses from some NG-RAN nodes. However, the problem with this approach is that the MB-SMF does not know how many NG-RAN nodes are involved and, thus, it cannot determine whether it received all responses of success or failure from all NG-RAN nodes. Consequently, the MB-SMF does not know whether the broadcast session was successfully established at/by all NG-RAN(s) and/or all cells within the MBS service area and, thus, if or when to report the delivery status of the broadcast session to the NEF, the MBSF or the AF. Further, the MB-SMF cannot determine when receiving a partial response from the AMF whether or not other responses are still to be expected.

Accordingly, there is a problem (as exemplified above with respect to current 3GPP standardization) in that the MB-SMF has to wait until receiving responses from or for all NG-RAN(s), i.e. all cells, within the MBS service area so as to be able to appropriately handle the thus established broadcast session. Such problem is particularly significant when point-to-point or unicast transport is used on N3mb, i.e. between the MB-UPF and the NG-RAN(s), as the N3mb broadcast session establishment is delayed.

Therefore, there is room for improvement and a desire/need for a technique for (enabling/realizing) broadcast session establishment, particularly improved broadcast session establishment within a multicast/broadcast service. More specifically, there is a desire/need for a technique for broadcast session establishment which is more effective in terms of accelerating broadcast session establishment and/or ensuring an appropriate report of the delivery status of the broadcast session.

SUMMARY

Various exemplifying embodiments of the present disclosure aim at addressing at least part of the above issues and/or problems and drawbacks.

Various aspects of exemplifying embodiments of the present disclosure are set out in the appended claims.

According to an example aspect of the present disclosure, there is provided a method of (or, stated in other words, operable or for use in/by) an access management element or function in a mobile communication system, comprising: issuing, in response to a request of broadcast session establishment from a session management element or function, one or more requests of broadcast session establishment operation to one or more radio access elements or functions, issuing a response of broadcast session establishment to the session management element or function, and providing an indication of completion of broadcast session establishment operation at the radio access elements or functions to the session management element or function upon obtaining a response of broadcast session establishment operation from all of the radio access elements or functions.

According to an example aspect of the present disclosure, there is provided an apparatus of (or, stated in other words, operable or for use in/by) an access management element or function in a mobile communication system, the apparatus comprising at least one processor and at least one memory including computer program code, wherein the processor, with the at least one memory and the computer program code, is configured to cause the apparatus to perform: issuing, in response to a request of broadcast session establishment from a session management element or function, one or more requests of broadcast session establishment operation to one or more radio access elements or functions, issuing a response of broadcast session establishment to the session management element or function, and providing an indication of completion of broadcast session establishment operation at the radio access elements or functions to the session management element or function upon obtaining a response of broadcast session establishment operation from all of the radio access elements or functions.

According to an example aspect of the present disclosure, there is provided an apparatus of (or, stated in other words, operable or for use in/by) of an access management element or function in a mobile communication system, comprising: means or circuitry for issuing, in response to a request of broadcast session establishment from a session management element or function, one or more requests of broadcast session establishment operation to one or more radio access elements or functions, means or circuitry for issuing a response of broadcast session establishment to the session management element or function, and means or circuitry for providing an indication of completion of broadcast session establishment operation at the radio access elements or functions to the session management element or function upon obtaining a response of broadcast session establishment operation from all of the radio access elements or functions.

According to various developments/modifications, any one of the aforementioned method-related and/or apparatus-related example aspects of the present disclosure may include one or more of the following features:

- the indication of completion of broadcast session establishment operation contains a success indication indicating an extent of success of the broadcast session establishment operation at the one or more radio access elements or functions,
- the success indication indicates complete success upon obtaining a response of successful broadcast session establishment operation, indicating complete success of the broadcast session establishment operation, from each of the one or more radio access elements or functions,
- the success indication indicates partial success upon obtaining a response of at least partially unsuccessful broadcast session establishment operation, indicating partial success or failure of the broadcast session establishment operation, from at least one of the one or more radio access elements or functions,
- the method, functionality or operability further comprises issuing a notification of broadcast session status update to the session management element or function upon obtaining one or several responses of broadcast session establishment operation from any one of the one or several radio access elements or functions after issuance of the response of broadcast session establishment,
- the indication of completion of broadcast session establishment operation at the radio access elements or functions is included in the response of broadcast session establishment to the session management element or function or in a last notification of broadcast session status update to the session management element or function,
- the method, functionality or operability further comprises providing a broadcast session establishment operation result for one or more of the radio access elements or functions to the session management element or function,
- the broadcast session establishment operation result for a radio access element or function is included in the response of broadcast session establishment to the session management element or function and/or in a notification of broadcast session status update to the session management element or function, which corresponds to said radio access element or function, a response of broadcast session establishment operation from a radio access element or function comprises a broadcast session establishment operation result comprising information on at least one of an indication of complete success of the broadcast session establishment operation, an indication of partial success of the broadcast session establishment operation, an indication of failure of the broadcast session establishment operation, one or more tracking areas, in which the broadcast session establishment operation succeeded, partially succeeded and/or failed, and one or more cells, in which the broadcast session establishment operation succeeded, partially succeeded and/or failed, the information comprises a list of at least one of a tracking area and one or more cells, in which at least one broadcast service flow is admitted, the information comprises a list of at least one of a tracking area and one or more cells, in which at least one broadcast service flow is not admitted, a response of broadcast session establishment operation from a radio access element or function, for which the broadcast session establishment operation succeeded in all of its cells, lacks a session management container or a transport address when a broadcast session to be established is configured to apply multicast transport towards the radio access elements or functions within a broadcast session service area specified in the request of broadcast session establishment from the session management element or function, a notification of broadcast session status update is not issued to the session management element or function upon obtaining the response of broadcast session establishment operation lacking the session management container or the transport address when it is not a last response of broadcast session establishment operation from the one or more radio access elements or functions, the request of broadcast session establishment includes a maximum response time, the method, functionality or operability further comprises starting, upon reception of the request of broadcast session establishment, a timer set to a value shorter than or equal to the value indicated by the maximum response time, and issuing, in response to the expiry of the timer before obtaining a response of broadcast session establishment operation from all of the one or more radio access elements or functions, a notification of broadcast session status update to the session management element or function, which indicates failure of completion of broadcast session establishment operation at the radio access elements or functions and/or comprises a list of at least one of tracking areas, one or more cells or one or more identifiers of radio access elements or functions for which the broadcast session establishment operation did not complete, the request of broadcast session establishment operation is issued to all radio access elements or functions within a broadcast session service area specified in the request of broadcast session establishment from the session management element or function, the request of broadcast session establishment operation relates to at least one of resource reservation or setup and context creation for a broadcast session to be established at or by the one or more radio access elements or functions, the request of broadcast session establishment relates to establishing a broadcast session within a multicast/broadcast service.

According to an example aspect of the present disclosure, there is provided a method of (or, stated in other words, operable or for use in/by) a session management element or function in a mobile communication system, comprising: issuing one or more requests of broadcast session establishment to one or more access management elements or functions, obtaining a response of broadcast session establishment from each of the one or more access management elements or functions, and obtaining an indication of completion of broadcast session establishment operation from one or more of the access management elements or functions.

According to an example aspect of the present disclosure, there is provided an apparatus of (or, stated in other words, operable or for use in/by) a session management element or function in a mobile communication system, the apparatus comprising at least one processor and at least one memory including computer program code, wherein the processor, with the at least one memory and the computer program code, is configured to cause the apparatus to perform: issuing one or more requests of broadcast session establishment to one or more access management elements or functions, obtaining a response of broadcast session establishment from each of the one or more access management elements or functions, and obtaining an indication of completion of broadcast session establishment operation from one or more of the access management elements or functions.

According to an example aspect of the present disclosure, there is provided an apparatus of (or, stated in other words, operable or for use in/by) a session management element or function in a mobile communication system, comprising: means or circuitry for issuing one or more requests of broadcast session establishment to one or more access management elements or functions, means or circuitry for obtaining a response of broadcast session establishment from each of the one or more access management elements or functions, and means or circuitry for obtaining an indication of completion of broadcast session establishment operation from one or more of the access management elements or functions.

According to various developments/modifications, any one of the aforementioned method-related and/or apparatus-related example aspects of the present disclosure may include one or more of the following features:

the method, functionality or operability further comprises determining overall completion of the broadcast session establishment based on the received indications of completion of broadcast session establishment operation from the one or more of the access management elements or functions, and issuing a status notification about completion of the broadcast session establishment to another network element or function upon determination of the overall completion of the broadcast session establishment, the indication of completion of broadcast session establishment operation contains a success indication indicating an extent of success of the broadcast session establishment operation at one or more radio access elements or functions, the success indication indicates complete success of successful broadcast session establishment operation, including complete success of the broadcast session establishment operation, at each of the one or more radio access elements or functions, the success indication indicates partial success of broadcast session establishment operation, including partial success or failure of the broadcast session establishment operation, at at least one of the one or more radio access elements or functions, the method, functionality or operability further comprises obtaining one or several notifications of broadcast session status update from the one or more access management elements or functions, the indication of completion of broadcast session establishment operation is included in the response of broadcast session establishment or in a last notification of broadcast session status update to the session management element or function, the method, functionality or operability further comprises obtaining a broadcast session establishment operation result for one or more of radio access elements or functions from the one or more of the session management elements or functions, the response of broadcast session establishment and/or one or several notifications of broadcast session status update from the one or more access management elements or functions include at least one of: an indication of complete success of the broadcast session establishment operation for one or more access management elements or functions, an indication of partial success of the broadcast session establishment operation for one or more access management elements or functions, an indication of failure of the broadcast session establishment operation for one or more access management elements or functions, one or more tracking areas, in which the broadcast session establishment operation succeeded, partially succeeded and/or failed, one or more cells, in which the broadcast session establishment operation succeeded, partially succeeded and/or failed, a list of at least one of a tracking area and one or more cells, in which at least one broadcast service flow is admitted, a list of at least one of a tracking area and one or more cells, in which at least one broadcast service flow is not admitted, and one or more radio access elements or functions, in which the broadcast session establishment operation succeeded, partially succeeded and/or failed, the method, functionality or operability further comprises determining an overall result of the broadcast session establishment operation based on the results of the broadcast session establishment operation reported by the one or more access management elements or functions, and denoting, in the status notification about completion of the broadcast session establishment, the overall result of the broadcast session establishment operation, wherein the overall result of the broadcast session establishment operation can be a successful, partially successful or failed establishment of the broadcast session, overall completion of the broadcast session establishment is determined when the indication of completion of broadcast session establishment operation is obtained from all of the one or more access management elements or functions, overall completion of the broadcast session establishment is determined when a predetermined time since issuance of the request of broadcast session establishment expires, success of the broadcast session establishment operation is determined when an indication of complete success is obtained from all of the one or more access management elements or functions, partial success or failure of establishment of the broadcast session operation is determined when the indication of completion of broadcast session establishment operation is not obtained from at least one of the one or more access management elements or functions within the predetermined time, the request of broadcast session establishment to one or more access management elements or functions includes a maximum response time, the method, functionality or operability further comprises obtaining a notification of broadcast session status update from an access management element or function, which indicates failure of completion of broadcast session establishment operation at the radio access elements or functions and/or comprises a list of at least one of tracking areas, one or more cells or one or more identifiers of radio access element identities for which the broadcast session establishment operation did not complete, the method, functionality or operability further comprises issuing, upon obtaining the notification indicating failure of completion of broadcast session establishment operation at the radio access elements or functions, a second request of broadcast session establishment to one or more access management elements or functions from which said notification is obtained, the second request includes the list of at least one of tracking areas, one or more cells or one or more of identifiers of radio access element identities for which the broadcast session establishment operation did not complete.

the method, functionality or operability further comprises monitoring conditions affecting delivery of the broadcast session, based on the broadcast session establishment operation result for one or more of radio access elements or functions, and issuing a status notification of the broadcast session, denoting the monitored conditions affecting delivery of the broadcast session, to a subscriber element or function subscribing status indication, the request of broadcast session establishment is issued to all access management elements or functions within a broadcast session service area, the request of broadcast session establishment relates to at least one of resource reservation or setup and context creation for a broadcast session to be established at or by the one or more radio access elements or functions, the request of broadcast session establishment relates to establishing a broadcast session within a multicast/broadcast service.

According to an example aspect of the present disclosure, there is provided a method of (or, stated in other words, operable or for use in/by) a radio access element or function in a mobile communication system, comprising: obtaining a request of broadcast session establishment operation from an access management element or function, performing the requested broadcast session establishment operation in a tracking area and one or more cells being served by the radio access element or function, and issuing a response of broadcast session establishment operation to the access management element or function when the broadcast session establishment operation is completed, wherein the response is a response of successful broadcast session establishment operation when the broadcast session establishment operation is successful in at least one of the tracking area and the one or more cells.

According to an example aspect of the present disclosure, there is provided an apparatus of (or, stated in other words, operable or for use in/by) a radio access element or function in a mobile communication system, the apparatus comprising at least one processor and at least one memory including computer program code, wherein the processor, with the at least one memory and the computer program code, is configured to cause the apparatus to perform: obtaining a request of broadcast session establishment operation from an access management element or function, performing the requested broadcast session establishment operation in a tracking area and one or more cells being served by the radio access element or function, and issuing a response of broadcast session establishment operation to the access management element or function when the broadcast session establishment operation is completed, wherein the response is a response of successful broadcast session establishment operation when the broadcast session establishment operation is successful in at least one of the tracking area and the one or more cells.

According to an example aspect of the present disclosure, there is provided an apparatus of (or, stated in other words, operable or for use in/by) a radio access element or function in a mobile communication system, comprising: means or circuitry for obtaining a request of broadcast session establishment operation from an access management element or function, means or circuitry for performing the requested broadcast session establishment operation in a tracking area and one or more cells being served by the radio access element or function, and means or circuitry for issuing a response of broadcast session establishment operation to the access management element or function when the broadcast session establishment operation is completed, wherein the response is a response of successful broadcast session establishment operation when the broadcast session establishment operation is successful in at least one of the tracking area and the one or more cells.

According to various developments/modifications, any one of the aforementioned method-related and/or apparatus-related example aspects of the present disclosure may include one or more of the following features:

- the method, functionality or operability further comprises providing a broadcast session establishment operation result to the access management element or function,
- the broadcast session establishment operation result comprises information on at least one of the tracking area and the one or more cells, in which the broadcast session establishment operation succeeded and/or failed,
- the information comprises a list of at least one of a tracking area and one or more cells, in which at least one broadcast service flow is admitted,
- the information comprises a list of at least one of a tracking area and one or more cells, in which at least one broadcast service flow is not admitted,
- the response of successful broadcast session establishment operation, for which the broadcast session establishment operation succeeded in all of the served cells, lacks a session management container or a transport address when a broadcast session to be established is configured to apply multicast transport towards the radio access element or function,
- the radio access element or function is within a broadcast session service area for broadcast session establishment,
- the request of broadcast session establishment operation relates to at least one of resource reservation or setup and context creation for a broadcast session to be established at or by the radio access element or function,
- the request of broadcast session establishment operation relates to establishing a broadcast session within a multicast/broadcast service.

According to an example aspect of the present disclosure, there is provided a computer program product comprising (computer-executable) computer program code which, when the program code is executed (or run) on a computer or the program is run on a computer (e.g. a computer of an apparatus according to any one of the aforementioned apparatus-related example aspects of the present disclosure), is configured to cause the computer to carry out the method according to any one of the aforementioned method-related example aspects of the present disclosure.

The computer program product may comprise or may be embodied as a (tangible/non-transitory) computer-readable (storage) medium or the like, on which the computer-executable computer program code is stored, and/or the program is directly loadable into an internal memory of the computer or a processor thereof.

Further developments and/or modifications of the aforementioned exemplary aspects of the present disclosure are set out in the following.

By way of exemplifying embodiments of the present disclosure, broadcast session establishment, particularly improved broadcast session establishment within a multicast/broadcast service, can be enabled/realized. More specifically, accelerating broadcast session establishment can be accelerated and/or an appropriate report of the delivery status of the broadcast session can be ensured.

BRIEF DESCRIPTION OF THE DRAWINGS

In the following, the present disclosure will be described in greater detail by way of non-limiting examples with reference to the accompanying drawings, in which.

DETAILED DESCRIPTION

Figure 1:
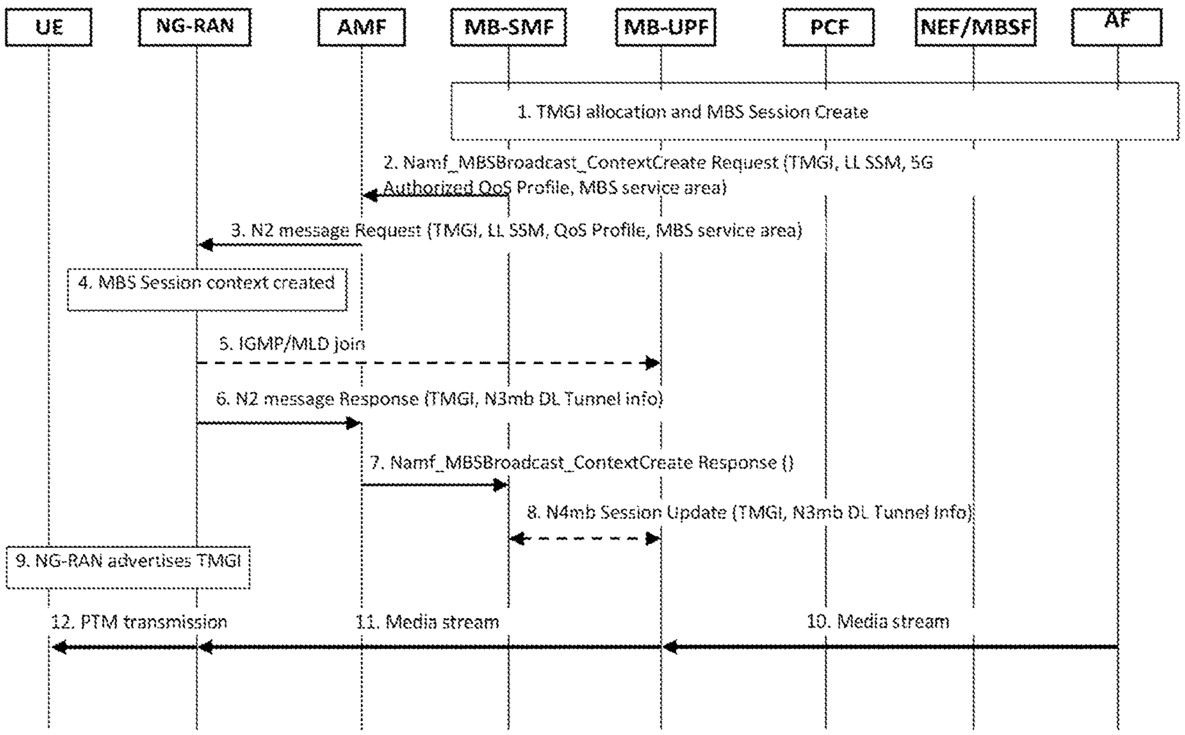
FIG. 1 shows a sequence diagram illustrating an example of an overview of broadcast session establishment in/for which at least one exemplifying embodiment is applicable.

The present disclosure is described herein with reference to particular non-limiting examples and to what are presently considered to be conceivable (examples of) embodiments. A person skilled in the art will appreciate that the present disclosure is by no means limited to these examples and embodiments, and may be more broadly applied.

It is to be noted that the following description mainly refers to specifications being used as non-limiting examples for certain exemplifying network configurations and system deployments. Namely, the following description mainly refers to 3GPP standards, specially referring to 5G/NR standardization, being used as non-limiting examples. As such, the description of exemplifying embodiments given herein specifically refers to terminology which is directly related thereto. Such terminology is only used in the context of the presented non-limiting examples and embodiments, and does naturally not limit the present disclosure in any way. Rather, any other system configuration or deployment may equally be utilized as long as complying with what is described herein and/or exemplifying embodiments described herein are applicable to it.

For examples, the present disclosure is equally applicable in any (mobile/wireless) communication system, such as 5G/NR systems and next generation systems beyond 5G (i.e. 6G, 7G, . . . ).

Hereinafter, various exemplifying embodiments and implementations of the present disclosure and its aspects are described using several variants and/or alternatives. It is generally to be noted that, according to certain needs and constraints, all of the described variants and/or alternatives may be provided alone or in any conceivable combination (also including combinations of individual features of the various variants and/or alternatives). In this description, the words "comprising" and "including" should be understood as not limiting the described exemplifying embodiments and implementations to consist of only those features that have been mentioned, and such exemplifying embodiments and implementations may also contain features, structures, units, modules etc. that have not been specifically mentioned.

In the drawings, it is to be noted that lines/arrows interconnecting individual blocks or entities are generally meant to illustrate an operational coupling there-between, which may be a physical and/or logical coupling, which on the one hand is implementation-independent (e.g. wired or wireless) and on the other hand may also comprise an arbitrary number of intermediary functional blocks or entities not shown. In flowcharts or sequence diagrams, the illustrated order of operations or actions is generally illustrative/exemplifying, and any other order of respective operations or actions is equally conceivable, if feasible.

According to exemplifying embodiments of the present disclosure, in general terms, there are provided measures/mechanisms (including methods, apparatuses (i.e. devices, entities, elements and/or functions) and computer program products) for enabling/realizing broadcast session establishment, particularly improved broadcast session establishment within a multicast/broadcast service.

Generally, when herein reference is made to broadcast session establishment, this could also/equally be regarded as broadcast session context creation, i.e. broadcast session establishment and broadcast session context creation can be regarded as synonymous or alternatives, especially regarding the interaction between an access management element or function and a session management element or function. This equally applies for terms like broadcast session establishment operation and broadcast session context creation operation as well as terms like broadcast session status update and broadcast session context update.

Figure 2:
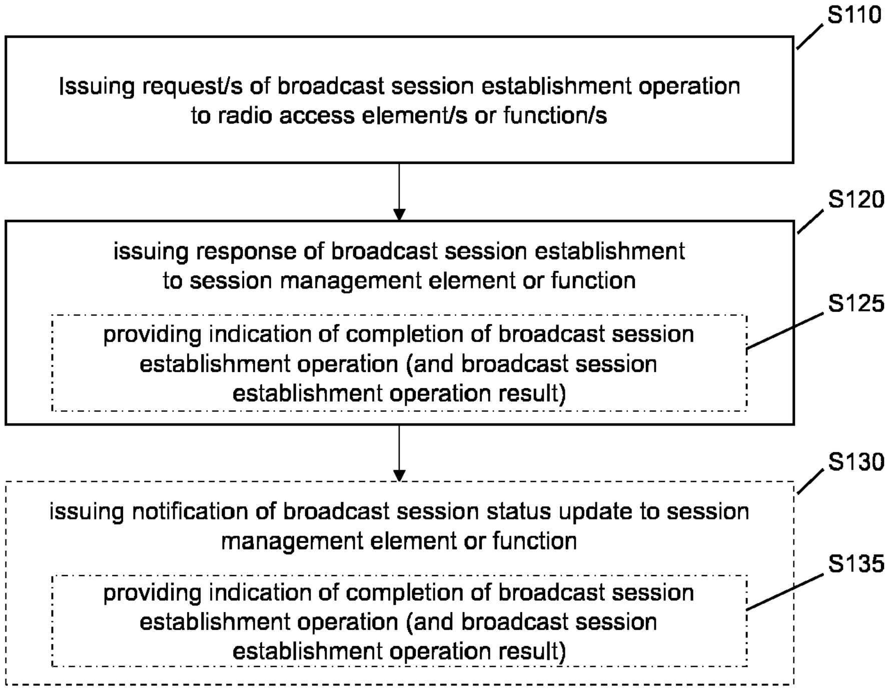
FIG. 2 shows a flowchart illustrating an example of a method or process according to at least one exemplifying embodiment.

FIG. 2 shows a flowchart illustrating an example of a method or process according to at least one exemplifying embodiment. The method or process of FIG. 2 is a method or process of (or, stated in other words, operable or for use in/by) of an access management element or function, or an element, function or entity of similar/comparable functionality or responsibility, in a mobile communication system. For example, the method or process of FIG. 2 may be carried out by/at an AMF, such as a 3GPP-standardized AMF in a broadcast session establishment as illustrated in FIG. 1.

As shown in FIG. 2, the method or process comprises an operation (S110) issuing (e.g. causing transmission of), in response to a request of broadcast session establishment from a session management element or function, one or more requests of broadcast session establishment operation to one or more radio access elements or functions (such as one request to each radio access element or function). Hence, the method or process may comprise an operation of obtaining (e.g. receiving) the request of broadcast session establishment from the session management element or function. In the operation S110, the request of broadcast session establishment operation can be and, preferably, is issued to all radio access elements or functions within a broadcast session service area specified in the request of broadcast session establishment from the session management element or function.

Further, the method or process comprises an operation (S120) issuing (e.g. causing transmission of) a response of broadcast session establishment to the session management element or function. Such response may be a response of successful broadcast session establishment which may be issued upon successful establishment of the broadcast session at the access management element or function. As described below, the successful establishment of the broadcast session may be determined by the access management element or function based on some predefined condition, such as one more criteria allowing to consider that the requested broadcast session establishment is successfully established (e.g. the access management element or function may determine that it received and stored all necessary information, which allows it to proceed with issuing a response of broadcast session establishment), or upon obtaining a first response of successful broadcast session establishment operation from one or more of the access elements or functions. In the latter case, the method or process may comprise an operation of obtaining (e.g. receiving) and/or detecting the first response of successful broadcast session establishment operation from one of the radio access elements or functions.

Still further, the method or process comprises an operation (S125, S135) of providing (e.g. causing transmission, provision or presentation of) an indication of completion of broadcast session establishment operation at the radio access elements or functions to the session management element or function upon obtaining a response of (successful/unsuccessful) broadcast session establishment operation from all of the radio access elements or functions. Hence, the method or process may comprise an operation of obtaining (e.g. receiving) and/or detecting a response of (successful/unsuccessful) broadcast session establishment operation from all of the radio access elements or functions, i.e. an operation of obtaining (e.g. receiving) and/or detecting a last response of (successful/unsuccessful) broadcast session establishment operation from radio access elements or functions.

As indicated by dashed lines, the method or process may comprise an operation (S130) of issuing (e.g. causing transmission of) a notification of broadcast session status update to the session management element or function upon obtaining one or several responses of (successful/unsuccessful) broadcast session establishment operation from any one of the one or more radio access elements or functions (after issuance of the response of successful broadcast session establishment). Hence, the method or process may comprise an operation of obtaining (e.g. receiving) and/or detecting one or more responses of (successful/unsuccessful) broadcast session establishment operation from one or more of the radio access elements or functions. If a response of successful broadcast session establishment operation is obtained from a radio access element or function, a notification of successful broadcast session status update may be issued.

According to an exemplifying embodiment, the indication of completion of broadcast session establishment operation at the radio access elements or functions may be included in the response of broadcast session establishment to the session management element or function. This is exemplified by operation S125 in FIG. 2, and is further detailed in FIG. 5.

According to an exemplifying embodiment, the indication of completion of broadcast session establishment operation at the radio access elements or functions may be included in a last notification of broadcast session status update to the session management element or function, i.e. a notification of broadcast session status update, which is issued when a last response of (successful/unsuccessful) broadcast session establishment operation from the radio access elements or functions is obtained. This is exemplified by operation S135 in FIG. 2, and is further detailed in FIG. 6.

The indication of completion of broadcast session establishment may contain a success indication indicating an extent of success of the broadcast session establishment operation at the one or more radio access elements or functions. For example, the success indication may indicate complete success, which may be issued/indicated upon obtaining a response of successful broadcast session establishment operation, indicating complete success of the broadcast session establishment operation, from each of the one or more radio access elements or functions, or the success indication may indicate partial success, which may be issued/indicated upon obtaining a response of at least partially unsuccessful broadcast session establishment operation, indicating partial success or failure of the broadcast session establishment operation, from at least one of the one or more radio access elements or functions, or the success indication may indicate failure of the broadcast session establishment operation, which may be issued/indicated upon obtaining a response of unsuccessful broadcast session establishment operation, indicating failure of the broadcast session establishment operation, from each of the one or more radio access elements or functions.

As also indicated in FIG. 2, the method or process may further comprise an operation of providing (e.g. causing transmission, provision or presentation of) a broadcast session establishment operation result for one or more of the radio access elements or functions to the session management element or function. Although such provision of a broadcast session establishment operation result is exemplarily illustrated in connection with the provision of the indication of completion of broadcast session establishment operation in any one of operations S125 and S135 in FIG. 2, this is for illustrative purposes and for the sake of simplicity only. Namely, the broadcast session establishment operation result is inherently independent of the indication of completion of broadcast session establishment operation, and may be provided by any means and/or at any stage in the method or process.

Figure 3:
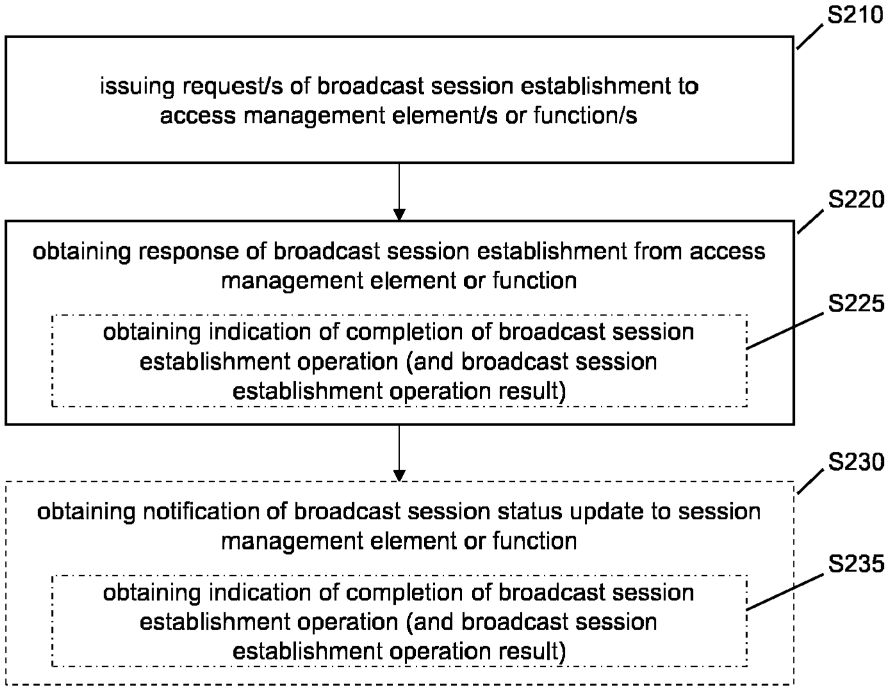
FIG. 3 shows a flowchart illustrating an example of a method or process according to at least one exemplifying embodiment.

FIG. 3 shows a flowchart illustrating an example of a method or process according to at least one exemplifying embodiment. The method or process of FIG. 3 is a method or process of (or, stated in other words, operable or for use in/by) of a session management element or function, or an element, function or entity of similar/comparable functionality or responsibility, in a mobile communication system. For example, the method or process of FIG. 3 may be carried out by/at a MB-SMF, such as a 3GPP-standardized MB-SMF in a broadcast session establishment as illustrated in FIG. 1.

As shown in FIG. 3, the method or process comprises an operation (S210) of issuing (e.g. causing transmission of) one or more requests of broadcast session establishment to one or more (requested/involved) access management elements or functions (such as one request to each access management element or function). Namely, when more than one access management element or function is involved, then the session management element or function may request the broadcast session establishment from each of these (involved) access management element or function. Further, the method or process comprises an operation (S220) of obtaining (e.g. receiving) a response of broadcast session establishment from an access management element or function or, more specifically, any one of the requested/involved access management element or functions. Such response may be a response of successful broadcast session establishment which may denote that the access management element or function (from which this response is obtained) determined successful establishment of the broadcast session, as described in in connection with FIG. 2. Further, the method or process comprises an operation (S225, S235) of obtaining an indication of completion of broadcast session establishment operation (at the radio access elements or functions) from one or more of the access management elements or functions or, more specifically, any one of the requested/involved access management element or functions. Such indication denotes that the access management element or function (from which this indication is obtained) obtained a response of (successful/unsuccessful) broadcast session establishment operation from all of requested radio access elements or functions.

As indicated by dashed lines, the method or process may comprise an operation (S230) of obtaining (e.g. receiving) a notification of broadcast session status update from the access management element or function. Such notification denotes that the access management element or function (from which this notification is obtained) obtained one or more responses of (successful/unsuccessful) broadcast session establishment operation from any one of the one or more requested radio access elements or functions (after issuance of the response of successful broadcast session establishment). The thus obtained notification may be a notification of successful broadcast session status update if the access management element or function obtained a response of successful broadcast session establishment operation.

According to an exemplifying embodiment, the indication of completion of broadcast session establishment operation at the radio access elements or functions may be included in the response of broadcast session establishment from the access management element or function. This is exemplified by operation S225 in FIG. 3, and is further detailed in FIG. 5.

According to an exemplifying embodiment, the indication of completion of broadcast session establishment operation at the radio access elements or functions may be included in a last notification of broadcast session status update from the access management element or function, i.e. a notification of broadcast session status update, which denotes that the access management element or function (from which this notification is obtained) obtained a last response of (successful/unsuccessful) broadcast session establishment operation from requested radio access elements or functions. This is exemplified by operation S235 in FIG. 3, and is further detailed in FIG. 6.

The indication of completion of broadcast session establishment may contain a success indication indicating an extent of success of the broadcast session establishment operation at the one or more radio access elements or functions. For example, the success indication may indicate complete success of successful broadcast session establishment operation, including/indicating complete success of the broadcast session establishment operation, at each of the one or more radio access elements or functions, or the success indication may indicate partial success of broadcast session establishment operation, including/indicating partial success or failure of the broadcast session establishment operation, at at least one of the one or more radio access elements or functions, or the success indication may indicate failure of the broadcast session establishment operation, including/indicating failure of the broadcast session establishment operation, at each of the one or more radio access elements or functions.

Further, the session management element or function may determine overall completion of the broadcast session establishment when an indication of completion of broadcast session establishment operation is obtained from all of the one or more access management elements or functions, and/or may determine overall completion of the broadcast session establishment when a predetermined time since issuance of the request of broadcast session establishment expires.

As also indicated in FIG. 3, the method or process may further comprise an operation of obtaining (e.g. receiving) a broadcast session establishment operation result for one or more of the radio access elements or functions from the access management element or function. Although such obtainment of a broadcast session establishment operation result is exemplarily illustrated in connection with the obtainment of the indication of completion of broadcast session establishment operation in any one of operations S225 and S235 in FIG. 3, this is for illustrative purposes and for the sake of simplicity only. Namely, the broadcast session establishment operation result is inherently independent of the indication of completion of broadcast session establishment operation, and may be obtained by any means and/or at any stage in the method or process.

Although not shown in FIG. 3, the method or process may further comprise an operation of determining overall completion of the broadcast session establishment based on the received indications of completion of broadcast session establishment operation from the one or more of the access management elements or functions, and operation of issuing a status notification about completion of the broadcast session establishment to another network element or function upon determination of the overall completion of the broadcast session establishment.

In this regard, the method or process may also comprise an operation of determining an overall result of the broadcast session establishment operation based on the results of the broadcast session establishment operation reported by the one or more access management elements or functions, and an operation of denoting, in the status notification about completion of the broadcast session establishment, the overall result of the broadcast session establishment operation, wherein the overall result of the broadcast session establishment operation can be a successful, partially successful or failed establishment of the broadcast session.

Figure 4:
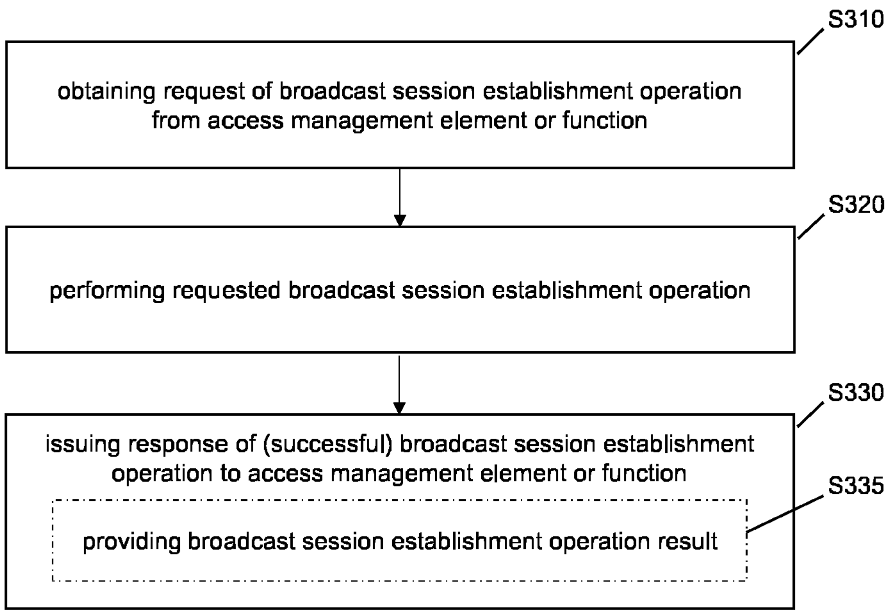
FIG. 4 shows a flowchart illustrating an example of a method or process according to at least one exemplifying embodiment.

FIG. 4 shows a flowchart illustrating an example of a method or process according to at least one exemplifying embodiment. The method or process of FIG. 4 is a method or process of (or, stated in other words, operable or for use in/by) of a radio access element or function, or an element, function or entity of similar/comparable functionality or responsibility, in a mobile communication system. For example, the method or process of FIG. 4 may be carried out by/at a NG-RAN, i.e. a NG-RAN node, such as a 3GPP-standardized NG-RAN or gNB in a broadcast session establishment as illustrated in FIG. 1.

As shown in FIG. 4, the method or process comprises an operation (S310) of obtaining (e.g. receiving) a request of broadcast session establishment operation from an access management element or function, an operation (S320) of performing the requested broadcast session establishment operation in a tracking area and one or more cells being served by the radio access element or function, and an operation (S330) of issuing (e.g. causing transmission of) a response of broadcast session establishment operation to the access management element or function when the broadcast session establishment operation is completed, wherein the response is a response of successful broadcast session establishment operation when the broadcast session establishment operation is successful in at least one of the tracking area and the one or more cells.

As indicated in FIG. 4, the method or process may further comprise an operation of providing (e.g. causing transmission, provision or presentation of) a broadcast session establishment operation result (for at least one of the tracking area and the one or more cells) to the access management element or function. Although such provision of a broadcast session establishment operation result is exemplarily illustrated in connection with the issuance of a response of (successful) broadcast session establishment operation in operation S335 in FIG. 4, this is for illustrative purposes and for the sake of simplicity only. Namely, the broadcast session establishment operation result is inherently independent of the response of (successful) broadcast session establishment operation, and may be provided by any means and/or at any stage in the method or process.

In the above description, the (request of) broadcast session establishment and/or the(request of) broadcast session establishment operation may relate to at least one of resource reservation or setup and context creation for a broadcast session to be established at or by a radio access element or function. Also, the (request of) broadcast session establishment may relate to establishing a broadcast session within a multicast/broadcast service.

In the following, further details of exemplifying embodiments are explained with reference to FIGS. 5 and 6.

In this regard, it is exemplarily assumed that the teaching of exemplifying embodiments is applied in the context/framework of broadcast session establishment according to current 3GPP standardization. Namely, the procedures of any one of FIGS. 5 and 6 can be (regarded as) a part of the sequence diagram of FIG. 1, specifically relating to steps 2, 3, 4, 6 and 7, or, stated in other words, the procedure between the MB-SMF, the AMF and the NG-RANs (wherein NG-RANs stands for one or more NG-RAN nodes, such as gNBs).

Yet, it is to be noted that such explanation with reference to current 3GPP standardization is made by way of example only, and the present disclosure is not restricted to the thus explained details or implementations.

Figure 5:
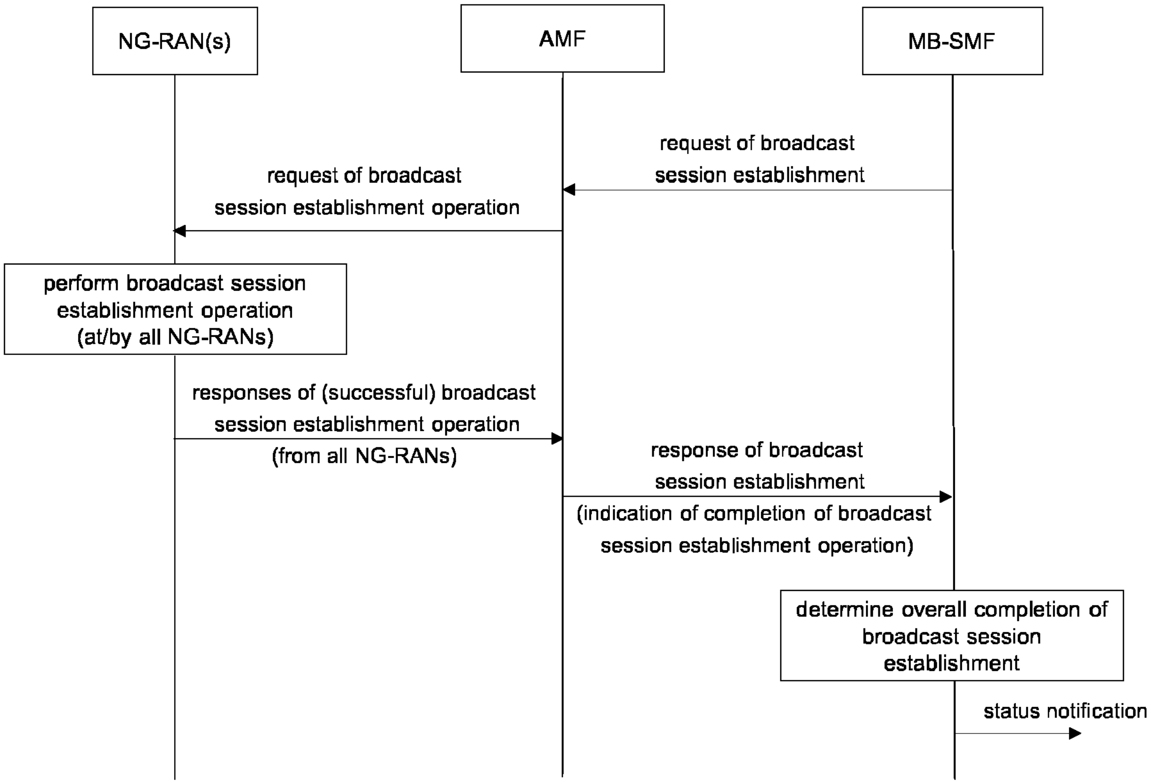
FIG. 5 shows a sequence diagram illustrating an example of a procedure of broadcast session establishment according to at least one exemplifying embodiment.

FIG. 5 shows a sequence diagram illustrating an example of a procedure of broadcast session establishment according to at least one exemplifying embodiment (wherein a single AMF is exemplified for the sake of lucidity).

As shown in FIG. 5, the MB-SMF sends (i.e. issues) a request of broadcast session establishment to the AMF representing one of the (selected) AMF(s) within a broadcast session or MBS service area. For example, this request may be in the form of an Namf_MBSBroadcast_ContextCreate Request. In the present case, the AMF sends (i.e. issues) a response of broadcast session establishment in response to the request of broadcast session establishment to the MB-SMF. For example, this response may be in the form of a broadcast session create or update response such as an Namf_MBSBroadcast_ContextCreate Response in response to an Namf_MBSBroadcast_ContextCreate Request, indicating (potentially) successful establishment of the broadcast session and/or successful creation of the broadcast MBS session context and, optionally also, if the AMF received one or several response of broadcast session establishment operation including a broadcast session establishment operation result (not shown in FIG. 5), a broadcast session establishment operation result for one or several of the NG-RANs within the broadcast session or MBS service area.

Upon receiving (i.e. obtaining) the request of broadcast session establishment, the AMF sends (i.e. issues) a request of broadcast session establishment operation to the NG-RAN(s) representing the (selected) NG-RAN(s), e.g. gNBs, within the broadcast session or MBS service area, which are served by the AMF. This request may be in the form of a N2 message request. Each of the NG-RAN(s) performs the requested broadcast session establishment operation, and the requested broadcast session establishment operation may (partly or fully) succeed or fail at/by each NG-RAN. In this regard, each of the NG-RAN(s) may try to perform resource reservation or setup and context creation for the broadcast session to be established in a tracking area and/or one or more cells being served by the respective NG-RAN. As a result thereof, each of the NG-RANs sends (i.e. issues) a response of broadcast session establishment operation to the AMF, which may be a response a successful or partially successful broadcast session establishment operation (meaning that the associated operation succeeded in at least one of the tracking area and one or more cells of at least one of the NG-RANs), or an unsuccessful broadcast session establishment operation (meaning that the associated operation did not succeed in at least one of the tracking area and one or more cells of at least one of the NG-RANs). The AMF receives (i.e. obtains) and monitors or checks (the reception of) these responses. As the AMF knows the number of requested NG-RANs, the AMF can determine whether one, more or all of the expected responses are received.

When the AMF determines a successful establishment of the broadcast session (at the AMF), the AMF sends (i.e. issues) its response of broadcast session establishment, e.g. the Namf_MBSBroadcast_ContextCreate Response, to the MB-SMF. As described above, there are various options for the AMF to determine the successful establishment of the broadcast session (at the AMF). Hence, the AMF may send (i.e. issue) its response of broadcast session establishment at any appropriate timing.

In the present example, it is assumed that the AMF determines the successful establishment of the broadcast session (at the AMF) by/upon obtaining a first response of (successful) broadcast session establishment operation from one of the access elements or functions.

When the AMF receives (i.e. determines to have received) responses of (successful) broadcast session establishment operation, e.g. successful establishment operation of a broadcast or MBS session (in at least part of its serviced area), from all of the NG-RANs prior to sending its response of broadcast session establishment, e.g. the Namf_MBSBroadcast_ContextCreate Response, to the MB-SMF, the AMF includes an indication of completion of broadcast session establishment operation at/by the NG-RANs in its response of broadcast session establishment, e.g. the Namf_MBSBroadcast_ContextCreate Response, to the MB-SMF. Optionally, the AMF may also include a broadcast session establishment operation result for one or more of the NG-RANs in its response of broadcast session establishment, e.g. the Namf_MBSBroadcast_ContextCreate Response, to the MB-SMF, or may otherwise provide a broadcast session establishment operation result for one or more of the NG-RANs to the MB-SMF.

As indicated above, the indication of completion of broadcast session establishment may contain a success indication indicating an extent of success of the broadcast session establishment operation at the one or more NG-RAN(s).

Yet, as noted above, the thus illustrated sequence is only an example, and the AMF may send (i.e. issue) its response of successful broadcast session establishment, e.g. the Namf_MBSBroadcast_ContextCreate Response, to the MB-SMF, whenever successfully establishment of the broadcast session is locally determined, irrespective of (i.e. even before) reception of a first response from the NG-RANs.

Accordingly, the MB-SMF knows (or, stated in other words, can determine) that there will be no further responses (or other notifications) in terms of the present broadcast session establishment from the AMF. Further, the MB-SMF knows that the broadcast session establishment operation was performed, e.g. the broadcast session was successfully established (or the broadcast session context was created), at/by all NG-RAN(s). The MB-SMF may know whether the broadcast session was successfully established in all cells within the MBS service area or only in some cells within the MBS service from the broadcast session establishment operation result. Alternatively, the MB-SMF may determine that the broadcast session was successfully established in all cells within the MBS service area when it knows there will be no further responses and no broadcast session establishment operation result was received. Thus, the MB-SMF can appropriately monitor these NG-RAN(s) and/or cells for conditions affecting the delivery of the MBS session, and can appropriately report these relevant conditions (as events), e.g. in the MBS Session Delivery Status Indication for Broadcast.

Then, as indicated in FIG. 5, the MB-SMF may determine overall completion of the broadcast session establishment based on the received indication of completion of broadcast session establishment operation from the AMF, and may issue a status notification about completion of the broadcast session establishment to another network element or function (from which it received a corresponding request or command underlying the issued request for broadcast session establishment) upon determination of the overall completion of the broadcast session establishment.

Figure 6:
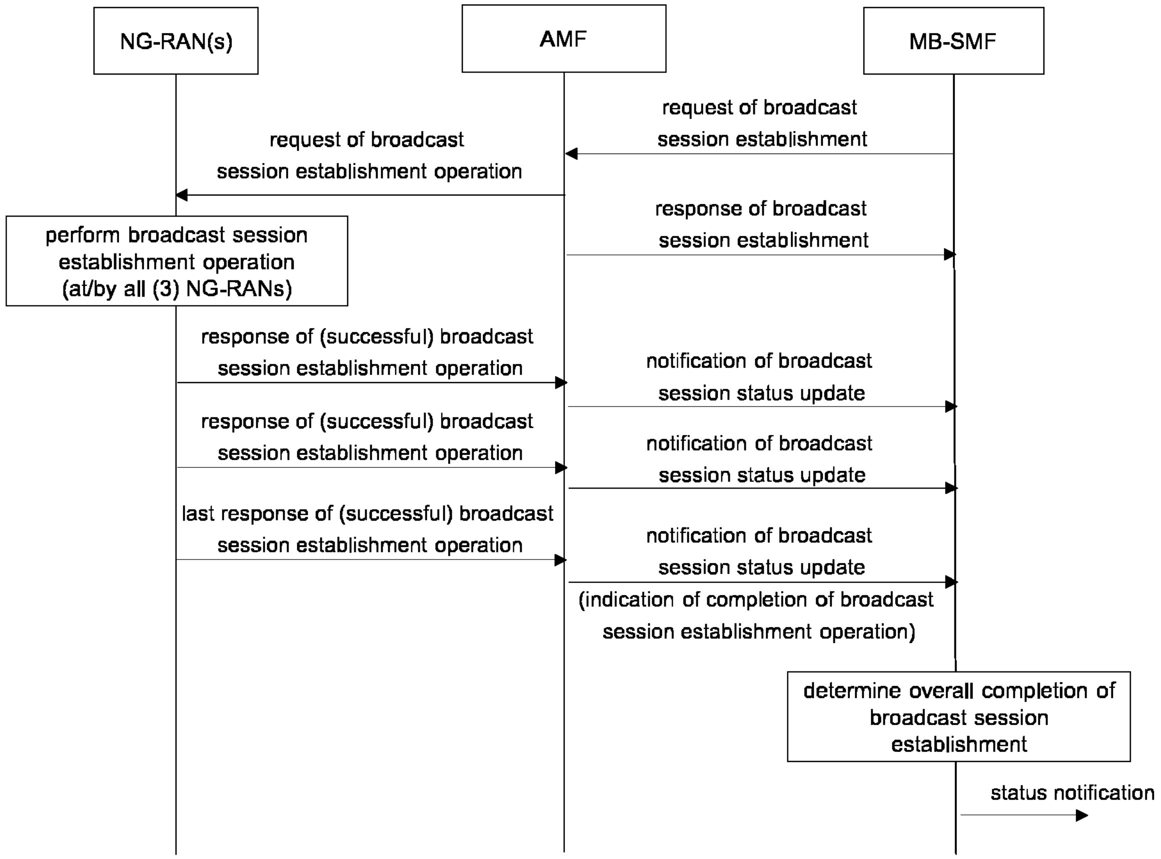
FIG. 6 shows a sequence diagram illustrating an example of a procedure of broadcast session establishment according to at least one exemplifying embodiment.

FIG. 6 shows a sequence diagram illustrating an example of a procedure of broadcast session establishment according to at least one exemplifying embodiment (wherein a single AMF is exemplified for the sake of lucidity).

As shown in FIG. 6, the MB-SMF sends (i.e. issues) a request of broadcast session establishment to the AMF representing one of the (selected) AMF(s) within a broadcast session or MBS service area. For example, this request may be in the form of an Namf_MBSBroadcast_ContextCreate Request. In the present case, the AMF sends (i.e. issues) a response of broadcast session establishment in response to the request of broadcast session establishment to the MB-SMF. For example, this response may be in the form of a broadcast session create or update response such as an Namf_MBSBroadcast_ContextCreate Response in response to an Namf_MBSBroadcast_ContextCreate Request, indicating (potentially) successful establishment of the broadcast session and/or successful creation of the broadcast MBS session context and, optionally also, if the AMF received one or several responses of broadcast session establishment operation including a broadcast session establishment operation result (not shown in FIG. 6), a broadcast session establishment operation result for one or several of the NG-RANs within the broadcast session or MBS service area.

Upon receiving (i.e. obtaining) the request of broadcast session establishment, the AMF sends (i.e. issues) a request of broadcast session establishment operation to the NG-RAN(s) representing the (selected) NG-RAN(s), e.g. gNBs, within the broadcast session or MBS service area, which are served by the AMF. This request may be in the form of a N2 message request. Each of the NG-RAN(s) performs the requested broadcast session establishment operation, and the requested broadcast session establishment operation may (partly or fully) succeed or fail at/by each NG-RAN. In this regard, each of the NG-RAN(s) may try to perform resource reservation or setup and context creation for the broadcast session to be established in a tracking area and/or one or more cells being served by the respective NG-RAN. As a result thereof, each of the NG-RANs sends (i.e. issues) a response of broadcast session establishment operation to the AMF, which may be a response a successful or partially successful broadcast session establishment operation (meaning that the associated operation succeeded in at least one of the tracking area and one or more cells of at least one of the NG-RANs), or an unsuccessful broadcast session establishment operation (meaning that the associated operation did not succeed in at least one of the tracking area and one or more cells of at least one of the NG-RANs). The AMF receives (i.e. obtains) and monitors or checks (the reception of) these responses. As the AMF knows the number of requested NG-RANs, the AMF can determine whether one, more or all of the expected responses are received.

When the AMF determines a successful establishment of the broadcast session (at the AMF), the AMF sends (i.e. issues) its response of broadcast session establishment, e.g. the Namf_MBSBroadcast_ContextCreate Response, to the MB-SMF. As described above, there are various options for the AMF to determine the successful establishment of the broadcast session (at the AMF). Hence, the AMF may send (i.e. issue) its response of broadcast session establishment at any appropriate timing.

In the present example, it is assumed that the AMF locally determines the successful establishment of the broadcast session (at the AMF) irrespective of (i.e. before) receiving a first response of broadcast session establishment operation from one of the access elements or functions. Accordingly, the AMF sends (i.e. issues) its response of broadcast session establishment, e.g. the Namf_MBSBroadcast_ContextCreate Response, to the MB-SMF.

When the AMF receives (i.e. determines to have received) a (first) response of (successful) broadcast session establishment operation, e.g. successful establishment of a broadcast or MBS session (in at least part of its serviced area), from one of the NG-RANs, the AMF sends (i.e. issues) a notification of broadcast session status update, e.g. in the form of an Namf_MBSBroadcast_ContextNotify Request, to the MB-SMF. In this notification, a broadcast session establishment operation result at/of the respective NG-RAN may be provided/included, which reflects the outcome of its broadcast session establishment operation.

When the AMF receives (i.e. determines to have received) a (subsequent) response of successful broadcast session establishment operation, e.g. successful establishment of a broadcast or MBS session (in at least part of its serviced area), from another one of the NG-RANs, the AMF sends (i.e. issues) a notification of broadcast session status update, e.g. in the form of an Namf_MBSBroadcast_ContextNotify Request, to the MB-SMF. In this notification, a broadcast session establishment operation result at/of the respective NG-RAN may be provided/included, which reflects the outcome of its broadcast session establishment operation.

When the AMF receives (i.e. determines to have received) a last response of (successful) broadcast session establishment operation, e.g. successful establishment of a broadcast or MBS session (in at least part of its serviced area), from still another one of the NG-RANs, the AMF sends (i.e. issues) a notification of broadcast session status update, e.g. in the form of an Namf_MBSBroadcast_ContextNotify Request, to the MB-SMF. In this last notification, a broadcast session establishment operation result at/of the respective NG-RAN may be provided/included, which reflects the outcome of its broadcast session establishment operation. In this last notification, the AMF includes an indication of completion of broadcast session establishment operation at/by the NG-RANs.

As indicated above, the indication of completion of broadcast session establishment may contain a success indication indicating an extent of success of the broadcast session establishment operation at the one or more NG-RAN(s).

While it is exemplarily illustrated that one notification is sent for one NG-RAN response, it is to be noted that a single notification may also be sent for multiple NG-RAN responses.

Optionally, the AMF may also include a broadcast session establishment operation result for one or more of the NG-RANs in this last notification of broadcast session status update, e.g. the Namf_MBSBroadcast_ContextNotify Request, to the MB-SMF, or may otherwise provide a broadcast session establishment operation result for one or more of the NG-RANs to the MB-SMF.

Accordingly, the MB-SMF knows (or, stated in other words, can determine) that there will be no further responses (or other notifications) in terms of the present broadcast session establishment from the AMF. Further, the MB-SMF knows that the broadcast session establishment operation was performed, e.g. the broadcast session was successfully established (or the broadcast session context was created), at/by all NG-RAN(s). The MB-SMF may know whether the broadcast session was successfully established in all cells within the MBS service area or only in some cells within the MBS service from the broadcast session establishment operation result. Alternatively, the MB-SMF may determine that the broadcast session was successfully established in all cells within the MBS service area when it knows there will be no further responses and no broadcast session establishment operation result was received. Thus, the MB-SMF can appropriately monitor these NG-RAN(s) and/or cells for conditions affecting the delivery of the MBS session, and can appropriately report these relevant conditions (as events), e.g. in the MBS Session Delivery Status Indication for Broadcast.

Then, as indicated in FIG. 6, the MB-SMF may determine overall completion of the broadcast session establishment based on the received indication of completion of broadcast session establishment operation from the AMF, and may issue a status notification about completion of the broadcast session establishment to another network element or function (from which it received a corresponding request or command underlying the issued request for broadcast session establishment) upon determination of the overall completion of the broadcast session establishment.

As is evident from FIGS. 5 and 6, if the AMF obtains all broadcast session establishment operation results for the NG-RANs within the broadcast session or MBS service area, includes a "broadcast session establishment completed" indication in the initial response (e.g. Namf_MBSBroadcast_ContextCreate Response). If the AMF obtains a first and subsequent broadcast session establishment operation result(s) for one or several additional of the NG-RANs within the broadcast session or MBS service area, it sends one or more notifications (e.g. Namf_MBSBroadcast_ContextNotify request) with those results towards the SMF. If the AMF determines that it received the results of the last or all NG-RANs within the broadcast session or MBS service area controlled by the AMF, it includes a "broadcast session establishment completed" indication in the (last) corresponding notification.

As is evident from FIGS. 5 and 6, after the MB-SMF has contacted AMFs to request broadcast session establishment, such as creation of the broadcast session context, the MB-SMF waits until it receives or has received the response of successful broadcast session establishment, e.g. an Namf_MBSBroadcast_ContextCreate Response, or the last notification of broadcast session status update, e.g. an Namf_MBSBroadcast_ContextNotify Request, with the indication of completion of broadcast session establishment operation, i.e. "broadcast session establishment completed" indication, from each of those AMFs before determining that the broadcast session has been established successfully. For that determination, the MB-SMF has to receive related responses and notifications from each contacted AMF indicating a (successful/unsuccessful) completion of broadcast session establishment operation. Thereupon, the MB-SMF may send (i.e. issue) a response indicating the successful establishment of the broadcast session, e.g. in the form of an Nmbsmf_MBSSession_StatusNotify message, towards the requesting AF/AS.

Accordingly, the indication of completion of broadcast session establishment, i.e. "broadcast session establishment completed" indication, has the purpose/effect to notify the MB-SMF that the broadcast session establishment operation at the (requested/involved) NG-RANs has completed. It can happen that one of the NG-RANs, e.g. the last gNB fails. In such case, the AMF should still report successful session establishment or context creation and provide at least information about the one or more NG-RANs where the operation failed.

Although not shown in FIGS. 5 and 6, the MB-SMF, after determining that the broadcast session establishment is completed, i.e. after receiving the "broadcast session establishment completed" indication, may perform a procedure for a delivery status notification, such as MBS Session Delivery Status Indication for Broadcast, as is defined in section 7.3.5 of 3GPP TS 23.247, V17.0.0 (2021 September). That is, the MB-SMF may monitor conditions affecting delivery of the broadcast session, based on the broadcast session establishment operation result for one or more of radio access elements or functions, and may issue a status notification of the broadcast session, denoting the monitored conditions affecting delivery of the broadcast session, to a subscriber element or function subscribing status indication.

The following explanations apply to any one of the aforementioned methods, processes and operations, either alone or in any conceivable combination.

The MB-SMF may start a timer when sending the requests to establish a broadcast session such as to create the broadcast session context in the AMFs. If the MB-SMF did not receive a response (e.g. Namf_MBSBroadcast_Context-Create Response) or a notification (e.g. Namf_MBSBroadcast_ContextNotify request), i.e. a last notification, with the "broadcast session establishment completed" indication from each of those AMFs at timer expiry, the MB-SMF may send (i.e. issue) a response indicating an incomplete establishment of the broadcast session, e.g. in the form of an Nmbsmf_MBSSession_StatusNotify message, towards the requesting AF/AS.

The request of broadcast session establishment by the MB-SMF may include a maximum response time.

If so, each AMF may start, upon reception of the request of broadcast session establishment from the MB-SMF, a timer set to a value shorter than or equal to the value indicated by the maximum response time (the timer should be slightly shorter than the maximum response time to accommodate e.g. message transmission transport delay), and may issue a corresponding notification depending on timer expiry. For example, the AMF may, when the timer expires before obtaining (i.e. receiving) a response of broadcast session establishment operation from all of the NG-RANs, a notification of broadcast session status update to the MB-SMF, which indicates failure of completion of broadcast session establishment operation at the NG-RANs and/or comprises a list of at least one of tracking areas, one or more cells or one or more identifiers of radio access elements or functions for which the broadcast session establishment operation did not complete (i.e. succeed).

Accordingly, when the MB-SMF would re-send the request to start the MBS session in NG-RANs reported as not responding, the new request from the MB-SMF could additionally include the list of such NG-RANs, such as to avoid the AMF repeating the request to NG-RANs of the same tracking area identifiers or the like, where the MBS session has been started successfully. The AMF could thus send the requests only towards such NG-RANs which were (at least partly) unsuccessful in a previous attempt, i.e. in response to a preceding request. If the MB-SMF is not provided with the information where the operation did not complete, i.e. succeed, beforehand, then it may resend the request to the AMF, and it would be up to any NG-RAN to discard any redundant request.

The MB-SMF may obtain (i.e. receive) a notification of broadcast session status update from an AMF, which indicates failure of completion of broadcast session establishment operation at the NG-RANs and/or comprises a list of at least one of tracking areas, one or more cells or one or more identifiers of radio access element identities for which the broadcast session establishment operation did not complete. Then, the MB-SMF may issuing (i.e. send), upon obtaining such notification indicating failure of completion of broadcast session establishment operation at the radio access elements or functions, a second request of broadcast session establishment to one or more AMF(s) from which said notification is obtained. The second request may include the list of at least one of tracking areas, one or more cells or one or more of identifiers of radio access element identities for which the broadcast session establishment operation did not complete (in a previous attempt, i.e. in response to a preceding request.

The MB-SMF may determine whether a broadcast session establishment operation is completed in all NG-RANs in response to the request of broadcast session establishment, based on corresponding responses and/or notifications from one or more AMFs being involved in the requested broadcast session establishment. Then, the MB-SMF may issue a status notification of the broadcast session, denoting successful or incomplete establishment of the broadcast session, to a subscriber element or function subscribing status indication based on a determination result.

In this regard, the MB-SMF may determine complete establishment of the broadcast session operation when the indication of completion of broadcast session establishment operation at the NG-RANs is obtained from all of the one or more AMFs or is obtained from all of the one or more AMFs within a predetermined time since issuance of the request of broadcast session establishment to at least one of the one or more AMFs, and/or the MB-SMF may determine incomplete establishment of the broadcast session operation when the indication of completion of broadcast session establishment operation at the NG-RANs is not obtained from all of the one or more AMFs or is not obtained from all of the one or more AMFs within a predetermined time since issuance of the request of broadcast session establishment to at least one of the one or more AMFs.

Accordingly, the MB-SMF may determine whether a broadcast session is successfully established in response to the request of broadcast session establishment, and issue a status notification of the broadcast session, denoting successful or incomplete establishment of the broadcast session, to a subscriber element or function subscribing status indication based on a determination result.

The gNB (i.e. NG-RAN) may consider the broadcast session establishment (broadcast MBS session start) operation as successful if the broadcast session can be started in at least one cell for at least one MBS QoS flow. Then, the gNB may report the operation as successful to the AMF, e.g. by transmitting an MBS broadcast session start response. That is, the broadcast session establishment operation may be considered successful for an NG-RAN if at least one MBS QoS flow is established successfully in at least one cell of that NG-RAN node, but might alternatively may be considered successful for an NG-RAN if it is successful (for at least one MBS QoS flow) in/for all affected cells of that NG-RAN.

The report from the NG-RAN to the AMF may include broadcast session establishment (broadcast MBS session start) result. For example, the report may include per tracking area and/or cell the information about the MBS QoS flow(s) that were successfully admitted (i.e. added) and/or the MBS QoS flow(s) that the gNB failed to admit (i.e. add). Yet, the information about the tracking areas and/or cells, where one or all MBS QoS flows were successfully admitted, and/or the information about admitted QoS flows may not be present in the response from the gNB, thereby reducing message size.

When the broadcast session cannot be established successfully by a given NG-RAN (i.e. gNB) in all or certain cells of the requested broadcast session or MBS service area, the reports/messages from the NG-RAN to the AMF and/or from the AMF to the MB-SMF (or some subsequent notification from the AM to the MB-SMF, as described above) may include a list of tracking areas with a list of the cells served by the NG-RAN where the broadcast session could not be established successfully because at least one MBS QoS flow was not successfully admitted. The reports/messages may but do not need to include a list of tracking areas with a list of the cells served by the NG-RAN where the broadcast session establishment was successful, wherein the message size may be reduced by omission of such information.

For an NG-RAN (i.e. gNB) that is able to establish successfully the broadcast or MBS session in all the cells of the requested broadcast session or MBS service area, the NG-RAN may report the success to the AMF but does not need to provide an N2 SM (session management) container, which would otherwise contain the information of all tracking areas and/or cells, all MBS QoS flows admitted, and a transport address, when (IP) multicast transport is used. That is, no transport address (i.e. N3mb DL Tunnel info) is required to be provided or included. This avoids the need for the AMF to transfer any N2 SM container in the response, e.g. a Create or Update MBS broadcast session response or MBS broadcast session context notify request, to the MB-SMF (when (IP) multicast transport is used over N3mb, i.e. between the MB-UPF and the NG-RAN(s), or for MBS data/session delivery). Namely, in this case, no unicast transport information (back by the gNB) needs to be provided. However, the AMF sends the notification (e.g. Namf_BroadcastSession_ContextNotify request) with the "broadcast session establishment completed" indication when obtaining a message indicating the success from the last NG-RAN.

In other words, the AMF knows that it does not need to send a notification (e.g. Namf_BroadcastSession_ContextNotify request) if it receives a response from the NG-RAN with no N2 SM container, the AMF already sent the initial response (e.g. Namf_BroadcastSession_ContextCreate Response), and the AMF is still expecting an answer from at least one other NG-RAN.

A (status update) notification of/for a successful broadcast session establishment operation needs not be reported to the MB-SMF unless this is the last response from all the NG-RANs. When it is not the last response, the behavior above applies regardless of whether the last response might be successful or not. A (status update) notification of/for an unsuccessful broadcast session establishment operation should be reported to the MB-SMF.

By virtue of exemplifying embodiments of the present disclosure, as evident from the above, broadcast session establishment, particularly improved broadcast session establishment within a multicast/broadcast service, can be enabled/realized. More specifically, broadcast session establishment can be accelerated and/or an appropriate report of the delivery status of the broadcast session can be ensured.

The above-described functionality as well as its related operations, procedures, methods and processes may be implemented by respective functional elements, entities, modules, units, processors, or the like, as described below. These functional elements, entities, modules, units, processors, or the like, i.e. the implementation of one or more exemplifying embodiments, may be realized in a cloud environment.

While in the foregoing exemplifying embodiments of the present disclosure are described mainly with reference to operations, procedures, methods and processes, corresponding exemplifying embodiments of the present disclosure also cover respective apparatuses, entities, modules, units, network nodes and/or systems, including software and/or hardware thereof.

Respective exemplifying embodiments of the present invention are described below referring to FIGS. 7 and 8, while for the sake of brevity reference is made to the detailed description of respective corresponding configurations/setups, schemes, processes, sequences, methods as well as functionalities, principles and operations according to FIGS. 1 to 6.

Figure 7:
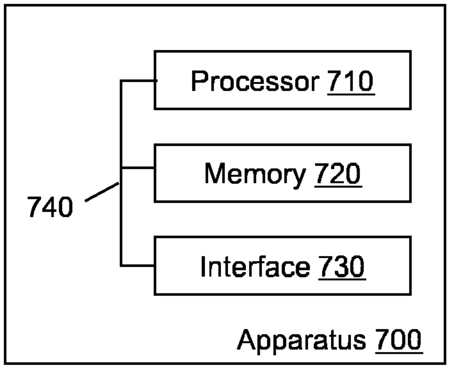
FIG. 7 shows a schematic block diagram illustrating an example of a structure of apparatuses according to at least one exemplifying embodiment.
Figure 8:
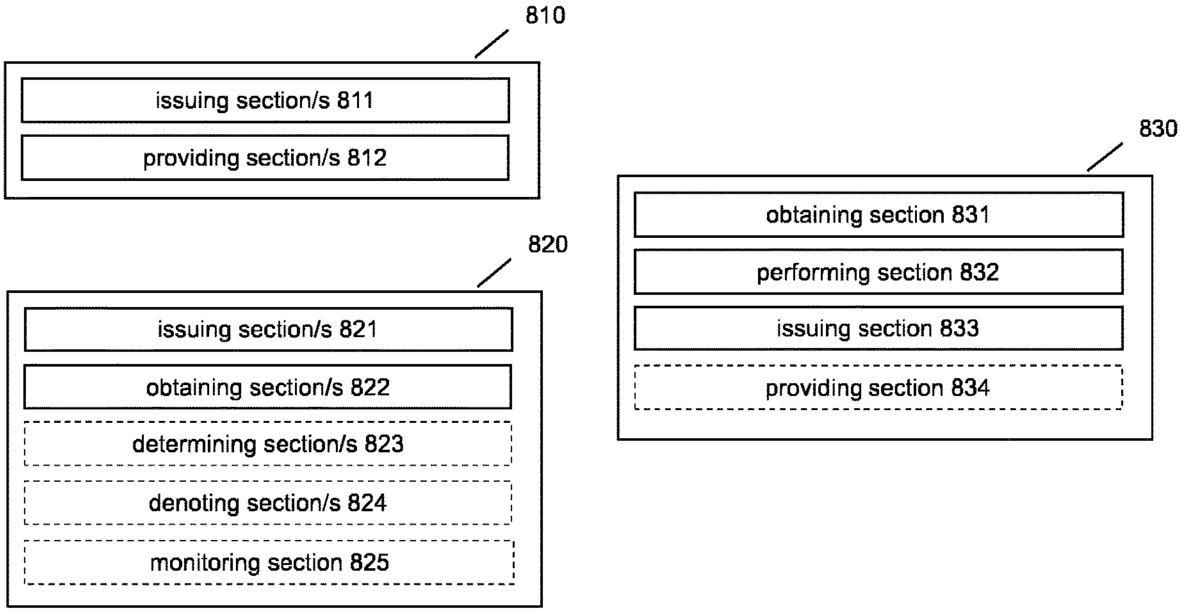
FIG. 8 shows a schematic block diagram illustrating an example of a structure of apparatuses according to at least one exemplifying embodiment.

In FIGS. 7 and 8, the blocks are basically configured to perform respective methods, procedures and/or functions as described above. The entirety of blocks are basically configured to perform the methods, procedures and/or functions as described above, respectively. With respect to FIGS. 7 and 8, it is to be noted that the individual blocks are meant to illustrate respective functional blocks implementing a respective function, process or procedure, respectively. Such functional blocks are implementation-independent, i.e. may be implemented by means of any kind of hardware or software or combination thereof, respectively.

Further, in FIGS. 7 and 8, only those functional blocks are illustrated, which relate to any one of the above-described methods, procedures and/or functions. A skilled person will acknowledge the presence of any other conventional functional blocks required for an operation of respective structural arrangements, such as e.g. a power supply, a central processing unit, respective memories or the like. Among others, one or more memories are provided for storing programs or program instructions for controlling or enabling the individual functional entities or any combination thereof to operate as described herein in relation to exemplifying embodiments.

FIG. 7 shows a schematic diagram illustrating an example of a structure of apparatuses according to at least one exemplifying embodiment. Herein, an apparatus can represent a physical entity or component, i.e. a structural device implementing a specific network element, entity or function or the functionality thereof as such, or a functional or logical entity or component. For example, the thus illustrated apparatus may be realized in or by a server or the like in a cloud environment, i.e. by a cloud-based implementation.

As indicated in FIG. 7, according to at least one exemplifying embodiment, an apparatus 700 may comprise or realize at least one processor 710 and at least one memory 720 (and possibly also at least one interface 730), which may be operationally connected or coupled, for example by a bus 740 or the like, respectively.

The processor 710 and/or the interface 730 of the apparatus 700 may also include a modem or the like to facilitate communication over a (hardwire or wireless) link, respectively. The interface 730 of the apparatus 700 may include a suitable transmitter, receiver or transceiver connected or coupled to one or more antennas, antenna units, such as antenna arrays or communication facilities or means for (hardwire or wireless) communications with the linked, coupled or connected device(s), respectively. The interface 730 of the apparatus 700 is generally configured to communicate with at least one other apparatus, device, node or entity (in particular, the interface thereof).

The memory 720 of the apparatus 700 may represent a (non-transitory/tangible) storage medium (e.g. RAM, ROM, EPROM, EEPROM, etc.) and store respective software, programs, program products, macros or applets, etc. or parts of them, which may be assumed to comprise program instructions or computer program code that, when executed by the respective processor, enables the respective electronic device or apparatus to operate in accordance with the exemplifying embodiments of the present invention. Further, the memory 720 of the apparatus 700 may (comprise a database to) store any data, information, or the like, which is used in the operation of the apparatus.

In general terms, respective apparatuses (and/or parts thereof) may represent means for performing respective operations and/or exhibiting respective functionalities, and/or the respective devices (and/or parts thereof) may have functions for performing respective operations and/or exhibiting respective functionalities.

In view of the above, the thus illustrated apparatus 700 is suitable for use in practicing one or more of the exemplifying embodiments, as described herein.

When in the subsequent description it is stated that the processor (or some other means) is configured to perform some function, this is to be construed to be equivalent to a description stating that a (i.e. at least one) processor or corresponding circuitry, potentially in cooperation with a computer program code stored in the memory of the respective apparatus or otherwise available (it should be appreciated that the memory may also be an external memory or provided/realized by a cloud service or the like), is configured to cause the apparatus to perform at least the thus mentioned function. It should be appreciated that herein processors, or more generally processing portions, should not be only considered to represent physical portions of one or more processors, but may also be considered as a logical division of the referred processing tasks performed by one or more processors.

According to at least one exemplifying embodiment, the thus illustrated apparatus 700 may represent or realize/embody a (part of a) access management element or function, or an element, function or entity of similar/comparable functionality or responsibility, in a mobile communication system, such as e.g. a (3GPP-standardized) AMF in a broadcast session establishment as illustrated in FIG. 1. Hence, the apparatus 700 may be configured to perform a procedure and/or exhibit a functionality and/or implement a mechanism, as described (for an access management element or function or an AMF) in any one of FIGS. 2, 5 and 6.

Accordingly, the apparatus 700 may be caused or the apparatus 700 or its at least one processor 710 (possibly together with computer program code stored in its at least one memory 720), in its most basic form, is configured to issue, in response to a request of broadcast session establishment from a session management element or function, one or more requests of broadcast session establishment operation to one or more radio access elements or functions, issue a response of broadcast session establishment to the session management element or function, and provide an indication of completion of broadcast session establishment operation at the radio access elements or functions to the session management element or function upon obtaining a response of broadcast session establishment operation from all of the radio access elements or functions.

According to at least one exemplifying embodiment, the thus illustrated apparatus 700 may represent or realize/embody a (part of a) session management element or function, or an element, function or entity of similar/comparable functionality or responsibility, in a mobile communication system, such as e.g. a (3GPP-standardized) MB-SMF in a broadcast session establishment as illustrated in FIG. 1. Hence, the apparatus 700 may be configured to perform a procedure and/or exhibit a functionality and/or implement a mechanism, as described (for a session management element or function or an MB-SMF) in any one of FIGS. 3, 5 and 6.

Accordingly, the apparatus 700 may be caused or the apparatus 700 or its at least one processor 710 (possibly together with computer program code stored in its at least one memory 720), in its most basic form, is configured to issue one or more requests of broadcast session establishment to one or more access management elements or functions, obtain a response of broadcast session establishment from each of the one or more access management elements or functions, and obtain an indication of completion of broadcast session establishment operation from one or more of the access management elements or functions.

According to at least one exemplifying embodiment, the thus illustrated apparatus 700 may represent or realize/embody a (part of a) radio access element or function, or an element, function or entity of similar/comparable functionality or responsibility, in a mobile communication system, such as e.g. a (3GPP-standardized) NG-RAN or gNB in a broadcast session establishment as illustrated in FIG. 1. Hence, the apparatus 700 may be configured to perform a procedure and/or exhibit a functionality and/or implement a mechanism, as described (for radio access element or function or an AMF) in any one of FIGS. 4, 5 and 6.

Accordingly, the apparatus 700 may be caused or the apparatus 700 or its at least one processor 710 (possibly together with computer program code stored in its at least one memory 720), in its most basic form, is configured to obtain a request of broadcast session establishment operation from an access management element or function, perform the requested broadcast session establishment operation in a tracking area and one or more cells being served by the radio access element or function, and issue a response of broadcast session establishment operation to the access management element or function when the broadcast session establishment operation is completed, wherein the response is a response of successful broadcast session establishment operation when the broadcast session establishment operation is successful in at least one of the tracking area and the one or more cells.

As mentioned above, an apparatus according to at least one exemplifying embodiment may be structured by comprising respective units or means for performing corresponding operations, procedures and/or functions. For example, such units or means may be implemented/realized on the basis of an apparatus structure, as exemplified in FIG. 8, i.e. by one or more processors 610, one or more memories 820, one or more interfaces 830, or any combination thereof.

FIG. 8 shows a schematic diagram illustrating an example of a structure of apparatuses according to at least one exemplifying embodiment.

As shown in FIG. 8, an apparatus 810 according to at least one exemplifying embodiment may represent or realize/embody a (part of a) access management element or function, or an element, function or entity of similar/comparable functionality or responsibility, in a mobile communication system, such as e.g. a (3GPP-standardized) AMF in a broadcast session establishment as illustrated in FIG. 1. Hence, the apparatus 810 may be configured to perform a procedure and/or exhibit a functionality and/or implement a mechanism, as described (for an access management element or function or an AMF) in any one of FIGS. 2, 5 and 6.

Such apparatus may comprise one or more unit/means/circuitry, denoted by issuing section/s 811, which represent any implementation for (or configured to) realizing/executing/accomplishing (realize/execute/accomplish) any issuing-related operation or functionality (of an access management element or function) as described herein, and one or more unit/means/circuitry, denoted by providing section/s 812, which represent any implementation for (or configured to) realizing/executing/accomplishing (realize/execute/accomplish) any providing-related operation or functionality (of an access management element or function) as described herein.

As shown in FIG. 8, an apparatus 820 according to at least one exemplifying embodiment may represent or realize/embody a (part of a) session management element or function, or an element, function or entity of similar/comparable functionality or responsibility, in a mobile communication system, such as e.g. a (3GPP-standardized) MB-SMF in a broadcast session establishment as illustrated in FIG. 1. Hence, the apparatus 820 may be configured to perform a procedure and/or exhibit a functionality and/or implement a mechanism, as described (for a session management element or function or an MB-SMF) in any one of FIGS. 3, 5 and 6.

Such apparatus may comprise one or more unit/means/circuitry, denoted by issuing section/s 821, which represent any implementation for (or configured to) realizing/executing/accomplishing (realize/execute/accomplish) any issuing-related operation or functionality (of a session management element or function) as described herein, and one or more unit/means/circuitry, denoted by obtaining section/s 822, which represent any implementation for (or configured to) realizing/executing/accomplishing (realize/execute/accomplish) any obtaining-related operation or functionality (of a session management element or function) as described herein.

Further, such apparatus may further comprise one or more unit/means/circuitry, denoted by determining section/s 823, which represent any implementation for (or configured to) realizing/executing/accomplishing (realize/execute/accomplish) any determining-related operation or functionality (of a session management element or function) as described herein, and/or one or more unit/means/circuitry, denoted by denoting section/s 824, which represent any implementation for (or configured to) realizing/executing/accomplishing (realize/execute/accomplish) any denoting-related operation or functionality (of a session management element or function) as described herein, and/or one or more unit/means/circuitry, denoted by monitoring section/s 825, which represent any implementation for (or configured to) realizing/executing/accomplishing (realize/execute/accomplish) any monitoring-related operation or functionality (of a session management element or function) as described herein.

As shown in FIG. 8, an apparatus 830 according to at least one exemplifying embodiment may represent or realize/embody a (part of a) radio access element or function, or an element, function or entity of similar/comparable functionality or responsibility, in a mobile communication system, such as e.g. a (3GPP-standardized) NG-RAN or gNB in a broadcast session establishment as illustrated in FIG. 1. Hence, the apparatus 830 may be configured to perform a procedure and/or exhibit a functionality and/or implement a mechanism, as described (for radio access element or function or an AMF) in any one of FIGS. 4, 5 and 6.

Such apparatus may comprise one or more unit/means/circuitry, denoted by obtaining section/s 831, which represent any implementation for (or configured to) realizing/executing/accomplishing (realize/execute/accomplish) any obtaining-related operation or functionality (of a radio access element or function) as described herein, one or more unit/means/circuitry, denoted by performing section/s 832, which represent any implementation for (or configured to) realizing/executing/accomplishing (realize/execute/accomplish) any performing-related operation or functionality (of a radio access element or function) as described herein, and one or more unit/means/circuitry, denoted by issuing section/s 833, which represent any implementation for (or configured to) realizing/executing/accomplishing (realize/execute/accomplish) any issuing-related operation or functionality (of a radio access element or function) as described herein.

Further, such apparatus may further comprise one or more unit/means/circuitry, denoted by providing section/s 834, which represent any implementation for (or configured to) realizing/executing/accomplishing (realize/execute/accomplish) any providing-related operation or functionality (of a radio access element or function) as described herein.

For further details regarding the operability/functionality of the apparatuses (or units/means thereof) according to exemplifying embodiments, reference is made to the above description in connection with any one of FIGS. 1 to 6, respectively.

According to exemplifying embodiments of the present disclosure, any one of the (at least one) processor, the (at least one) memory and the (at least one) interface, as well as any one of the illustrated units/means, may be implemented as individual modules, chips, chipsets, circuitries or the like, or one or more of them can be implemented as a common module, chip, chipset, circuitry or the like, respectively.

According to exemplifying embodiments of the present disclosure, a system may comprise any conceivable combination of any depicted or described apparatuses and other network elements or functional entities, which are configured to cooperate as described above.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, a basic system architecture of a (tele)communication network including a mobile communication system where some examples of exemplifying embodiments are applicable may include an architecture of one or more communication networks including wireless access network sub-/system(s) and possibly core network(s). Such an architecture may include one or more communication network control elements or functions, such as e.g. access network elements, radio access network elements, access service network gateways or base transceiver stations, like a base station, an access point, a NodeB (NB), an eNB or a gNB, a distributed or a centralized unit, which controls a respective coverage area or cell(s) and with which one or more communication stations such as communication elements or functions, like user devices or terminal devices, like a UE, or another device having a similar function, such as a modem chipset, a chip, a module etc., which can also be part of a station, an element, a function or an application capable of conducting a communication, such as a UE, an element or function usable in a machine-to-machine communication architecture, or attached as a separate element to such an element, function or application capable of conducting a communication, or the like, are capable to communicate via one or more channels via one or more communication beams for transmitting several types of data in a plurality of access domains. Furthermore, core network elements or network functions, such as gateway network elements/functions, mobility management entities, a mobile switching center, servers, databases and the like may be included.

The general functions and interconnections of the described elements and functions, which also depend on the actual network type, are known to those skilled in the art and described in corresponding specifications, so that a detailed description thereof is omitted herein. It should be appreciated that several additional network elements and signaling links may be employed for a communication to or from an element, function or application, like a communication endpoint, a communication network control element, such as a server, a gateway, a radio network controller, and other elements of the same or other communication networks besides those described in detail herein below.

A communication network architecture as being considered in examples of exemplifying embodiments may also be able to communicate with other networks, such as a public switched telephone network or the Internet, including the Internet-of-Things. The communication network may also be able to support the usage of cloud services for virtual network elements or functions thereof, wherein it is to be noted that the virtual network part of the (tele)communication network can also be provided by non-cloud resources, e.g. an internal network or the like. It should be appreciated that network elements of an access system, of a core network etc., and/or respective functionalities may be implemented by using any node, host, server, access node or entity etc. being suitable for such a usage. Generally, a network function can be implemented either as a network element on a dedicated hardware, as a software instance running on a dedicated hardware, or as a virtualized function instantiated on an appropriate platform, e.g. a cloud infrastructure.

Any method step is suitable to be implemented as software or by hardware without changing the idea of the present disclosure. Such software may be software code independent and can be specified using any known or future developed programming language, such as e.g. Java, C++, C, and Assembler, as long as the functionality defined by the method steps is preserved. Such hardware may be hardware type independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components. A device/apparatus may be represented by a semiconductor chip, a chipset, or a (hardware) module comprising such chip or chipset; this, however, does not exclude the possibility that a functionality of a device/apparatus or module, instead of being hardware implemented, be implemented as software in a (software) module such as a computer program or a computer program product comprising executable software code portions for execution/being run on a processor. A device may be regarded as a device/apparatus or as an assembly of more than one device/apparatus, whether functionally in cooperation with each other or functionally independently of each other but in a same device housing, for example.

Apparatuses and/or units/means or parts thereof can be implemented as individual devices, but this does not exclude that they may be implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

The present disclosure also covers any conceivable combination of method steps and operations described above, and any conceivable combination of nodes, apparatuses, modules or elements described above, as long as the above-described concepts of methodology and structural arrangement are applicable.

In view of the above, there are provided measures for enabling/realizing broadcast session establishment, particularly improved broadcast session establishment within a multicast/broadcast service. Such measures exemplarily comprise that an access management element or function in a mobile communication system issues, in response to a request of broadcast session establishment from a session management element or function, one or more requests of broadcast session establishment operation to one or more radio access elements or functions, issuing a response of broadcast session establishment to the session management element or function, and provides an indication of completion of broadcast session establishment operation at the radio access elements or functions to the session management element or function upon obtaining a response of broadcast session establishment operation from all of the radio access elements or functions.

Even though the present disclosure is described above with reference to the examples according to the accompanying drawings, it is to be understood that the present disclosure is not restricted thereto. Rather, it is apparent to those skilled in the art that the present disclosure can be modified in many ways without departing from the scope of the inventive idea as disclosed herein.

LIST OF ACRONYMS AND ABBREVIATIONS

3GPP 3rd Generation Partnership Project
5G 5$^{th}$ Generation
5GC 5G Core
6G 6$^{th}$ Generation
7G 7th Generation
AF Application Function
AMF Access and Mobility Management Function
DL Downlink
IGMP Internet Group Management Protocol
IP Internet Protocol
LL MC Lower Layer Multicast address
LL SSM Lower Layer Source Specific Multicast address
MB-SMF Multicast/Broadcast Session Management Function.
MB-UPF Multicast/Broadcast User Plane Function
MBMS Multimedia Broadcast/Multicast Service
MBS Multicast/Broadcast Service.
MBSF Multicast/Broadcast Service Function
MLD Multicast Listener Discovery
NEF Network Exposure Function
NG-RAN Next Generation RAN
PCF Policy Control Function
PTM Point To Multipoint
QoS Quality of Service
RAN Radio Access Network^
SM Session Management
TMGI Temporary Mobile Group Identity
UE User Equipment

The invention claimed is:

1. An apparatus for an access management element or function of a mobile communication system, the apparatus comprising:
at least one processor; and
at least one memory including computer program code, wherein the at least one memory and the computer program code, with the at least one processor, are configured to cause the apparatus to perform:
issuing, in response to a request of broadcast session establishment from a session management element or function, one or more requests of broadcast session establishment operation to one or more radio access elements or functions, wherein the request of broadcast session establishment includes a maximum response time,
issuing a response of broadcast session establishment to the session management element or function, and
providing an indication of completion of broadcast session establishment operation at the one or more radio access elements or functions to the session management element or function upon obtaining a response of broadcast session establishment operation from all of the one or more radio access elements or functions, wherein the indication of completion of broadcast session establishment operation comprises an indication from a list of indications indicating an extent of success of the broadcast session establishment operation at the one or more radio access elements or functions, wherein the list of indications comprises complete success, partial success, and failure.

2. The apparatus according to claim 1, wherein
the indication indicating complete success upon obtaining a response of successful broadcast session establishment operation, indicating complete success of the broadcast session establishment operation, from each of the one or more radio access elements or functions, or
the indication indicating partial success upon obtaining a response of at least partially unsuccessful broadcast session establishment operation, indicating partial success or failure of the broadcast session establishment operation, from at least one of the one or more radio access elements or functions.

3. The apparatus according to claim 1, wherein the at least one memory and the computer program code, with the at least one processor, are configured to cause the apparatus to perform:
issuing a notification of broadcast session status update to the session management element or function upon obtaining one or more responses of broadcast session establishment operation from any one of the one or more radio access elements or functions after issuance of the response of broadcast session establishment.

4. The apparatus according to claim 1, wherein the indication of completion of broadcast session establishment operation at the one or more radio access elements or functions is included in the response of broadcast session establishment to the session management element or function or in a last notification of broadcast session status update to the session management element or function.

5. The apparatus according to claim 1, wherein the at least one memory and the computer program code, with the at least one processor, are configured to cause the apparatus to perform:

providing a broadcast session establishment operation result for at least one of the one or more radio access elements or functions to the session management element or function.

6. The apparatus according to claim 1, wherein a response of broadcast session establishment operation from a radio access element or function comprises a broadcast session establishment operation result comprising information on at least one of an indication of complete success of the broadcast session establishment operation, an indication of partial success of the broadcast session establishment operation, an indication of failure of the broadcast session establishment operation, one or more tracking areas, in which the broadcast session establishment operation succeeded, partially succeeded and/or failed, and one or more cells, in which the broadcast session establishment operation succeeded, partially succeeded and/or failed.

7. The apparatus according to claim 1, wherein the at least one memory and the computer program code, with the at least one processor, are configured to cause the apparatus to perform:

starting, upon reception of the request of broadcast session establishment, a timer set to a value shorter than or equal to the value indicated by the maximum response time, and issuing, in response to the expiry of the timer before obtaining a response of broadcast session establishment operation from all of the one or more radio access elements or functions, a notification of broadcast session status update to the session management element or function, which indicates failure of completion of broadcast session establishment operation at the one or more radio access elements or functions and/or comprises a list of at least one of tracking areas, one or more cells or one or more identifiers of radio access elements or functions for which the broadcast session establishment operation did not complete.

8. An apparatus for a session management element or function of a mobile communication system, the apparatus comprising:

at least one processor; and at least one memory including computer program code, wherein the at least one memory and the computer program code, with the at least one processor, are configured to cause the apparatus to perform:

issuing one or more requests of broadcast session establishment to one or more access management elements or functions, wherein the one or more requests of broadcast session establishment to the one or more access management elements or functions include a maximum response time, obtaining a response of broadcast session establishment from each of the one or more access management elements or functions, and obtaining an indication of completion of broadcast session establishment operation from at least one of the one or more access management elements or functions, wherein the indication of completion of broadcast session establishment operation comprises an indication from a list of indications indicating an extent of success of the broadcast session establishment operation at one or more radio access elements or functions, wherein the list of indications comprises complete success, partial success, and failure.

9. The apparatus according to claim 8, wherein the at least one memory and the computer program code, with the at least one processor, are configured to cause the apparatus to perform:

determining overall completion of the broadcast session establishment based on the indications of completion of broadcast session establishment operation obtained from the one or more of the access management elements or functions, and issuing a status notification about completion of the broadcast session establishment to another network element or function upon determination of the overall completion of the broadcast session establishment.

10. The apparatus according to claim 9, wherein the at least one memory and the computer program code, with the at least one processor, are configured to cause the apparatus to perform:

determining an overall result of the broadcast session establishment operation based on the results of the broadcast session establishment operation reported by the one or more access management elements or functions, and denoting, in the status notification about completion of the broadcast session establishment, the overall result of the broadcast session establishment operation, wherein the overall result of the broadcast session establishment operation can be a successful, partially successful or failed establishment of the broadcast session.

11. The apparatus according to claim 8, wherein the indication indicating complete success of successful broadcast session establishment operation, indicates complete success of the broadcast session establishment operation, at each of the one or more radio access elements or functions, or the indication indicating partial success of broadcast session establishment operation, indicates partial success or failure of the broadcast session establishment operation, at at least one of the one or more radio access elements or functions.

12. The apparatus according to claim 8, wherein the indication of completion of broadcast session establishment operation is included in the response of broadcast session establishment or in a last notification of broadcast session status update to the session management element or function.

13. The apparatus according to claim 8, wherein the at least one memory and the computer program code, with the at least one processor, are configured to cause the apparatus to perform:

monitoring conditions affecting delivery of the broadcast session, based on a result of the broadcast session establishment operation for at least one of the one or more of radio access elements or functions, and issuing a status notification of the broadcast session, denoting the monitored conditions affecting delivery of the broadcast session, to a subscriber element or function subscribing to status indications.

14. An apparatus for a radio access element or function of a mobile communication system, the apparatus comprising:

at least one processor; and at least one memory including computer program code, wherein the at least one memory and the computer program code, with the at least one processor, are configured to cause the apparatus to perform:

obtaining a request of broadcast session establishment operation from an access management element or function, wherein the request of broadcast session establishment operation is associated with a request of broadcast session establishment including a maximum response time, performing the broadcast session establishment operation as requested in tracking areas and one or more cells served by the radio access element or function, and issuing a response of broadcast session establishment operation to the access management element or function when the broadcast session establishment operation is completed, wherein the response is a response of successful broadcast session establishment operation when the broadcast session establishment operation is successful in at least one of the tracking areas and the one or more cells, and the response is a response of broadcast session establishment operation failure when the broadcast session establishment operation is successful in none of the tracking areas and the one or more cells.

15. The apparatus according to claim 14, wherein the at least one memory and the computer program code, with the at least one processor, are configured to cause the apparatus to perform:

providing a broadcast session establishment operation result to the access management element or function.

16. The apparatus according to claim 15, wherein the broadcast session establishment operation result comprises information on at least one of the tracking areas and the one or more cells, in which the broadcast session establishment operation succeeded and/or failed.

* * * * *